(12) United States Patent  
Suga

(10) Patent No.: US 10,310,334 B2  
(45) Date of Patent: Jun. 4, 2019

(54) DISPLAY DEVICE AND METHOD OF PRODUCING DISPLAY DEVICE

(71) Applicant: SHARP KABUSHIKI KAISHA, Sakai, Osaka (JP)

(72) Inventor: Katsuyuki Suga, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/736,740

(22) PCT Filed: Jun. 9, 2016

(86) PCT No.: PCT/JP2016/067171  
§ 371 (c)(1),  
(2) Date: Dec. 14, 2017

(87) PCT Pub. No.: WO2016/204055  
PCT Pub. Date: Dec. 22, 2016

(65) Prior Publication Data  
US 2018/0188566 A1 Jul. 5, 2018

(30) Foreign Application Priority Data  
Jun. 16, 2015 (JP) .................................. 2015-121208

(51) Int. Cl.  
*G02F 1/1339* (2006.01)  
*G02F 1/1345* (2006.01)  
(Continued)

(52) U.S. Cl.  
CPC .......... *G02F 1/1339* (2013.01); *G02F 1/1345* (2013.01); *G02F 1/1368* (2013.01);  
(Continued)

(58) Field of Classification Search  
CPC ................. G02F 1/1339; G02F 1/1368; G02F 1/133305; G02F 1/1345; G09F 9/00  
See application file for complete search history.

(56) References Cited

U.S. PATENT DOCUMENTS

2001/0041392 A1 11/2001 Suzawa et al.  
2004/0195590 A1 10/2004 Suzawa et al.  
(Continued)

FOREIGN PATENT DOCUMENTS

JP 5-021240 U 3/1993  
JP 2009-128779 A 6/2009  
(Continued)

*Primary Examiner* — David V Bruce  
(74) *Attorney, Agent, or Firm* — ScienBiziP, P.C.

(57) ABSTRACT

A display device includes a display panel 10 including a first substrate 30A having thin film patterns 30L on a section of a plate surface thereof and a second substrate 20A that is bonded to the first substrate 30A with sealant 40 that is disposed to surround the thin film patterns 30L, the display panel 10 performing displaying, and a resin film 12 having flexibility and configuring a section of the thin film patterns 30L and extending outside the sealant 40 continuously from the thin film patterns 30L, the resin film 12 having a section outside the sealant 40 and at least the section having metal lines 13 through which signals for driving the display panel 10 are transmitted.

11 Claims, 25 Drawing Sheets

(51) Int. Cl.
*G02F 1/1333* (2006.01)
*G02F 1/1368* (2006.01)
*G02F 1/1362* (2006.01)

(52) U.S. Cl.
CPC .... *G02F 1/13452* (2013.01); *G02F 1/133305* (2013.01); *G02F 1/133345* (2013.01); *G02F 1/136227* (2013.01)

(56) References Cited

U.S. PATENT DOCUMENTS

| | | |
|---|---|---|
| 2007/0111424 A1 | 5/2007 | Suzawa et al. |
| 2014/0049742 A1 | 2/2014 | Misono |
| 2014/0092338 A1* | 4/2014 | Miyazaki ............ G02F 1/13452 349/58 |
| 2014/0204324 A1 | 7/2014 | Takeguchi |

FOREIGN PATENT DOCUMENTS

| | | | |
|---|---|---|---|
| JP | 2012-109579 A | 6/2012 |
| JP | 2014-142446 A | 8/2014 |
| WO | 2012/147322 A1 | 11/2012 |
| WO | 2012/147672 A1 | 11/2012 |

\* cited by examiner

DISPLAY DEVICE AND METHOD OF PRODUCING DISPLAY DEVICE

TECHNICAL FIELD

The present invention relates to a display device, and a method of producing a display device.

BACKGROUND ART

In a display panel such as a liquid crystal panel included in a display device, a technology for connecting a flexible circuit board having flexibility to an outer frame portion of a substrate included in the display panel has been known. The flexible circuit board is connected to the outer frame portion to supply driving signals or power to the display panel. Generally, in a method of producing a display device, after a pair of substrates of the display panel are bonded to each other with a sealant, such a flexible circuit board disposed on and connected to an outer frame portion of one of the substrates via an anisotropic conductive film (ACF). A liquid crystal display device including a flexible circuit board that is connected to the substrate of the display panel via the ACF is disclosed in Patent Document 1.

RELATED ART DOCUMENT

Patent Document

Patent Document 1: Unexamined Japanese Patent Application Publication No. 2009-128779

Problem to be Solved by the Invention

However, in the liquid crystal display device disclosed in Patent Document 1, the liquid crystal panel includes a silicon substrate and a transparent substrate that are bonded to each other with a sealant, and a connection area (a mounting area) for connecting the flexible circuit board is provided on a part of the silicon substrate and outside the sealant so as to be projected from the transparent substrate. The flexible board is connected to the silicon substrate with thermocompression bonding and therefore, the connection area of the flexible circuit board necessarily has a width of approximately 1 mm to 2 mm. Therefore, in a configuration that the silicon substrate has the mounting area for the flexible circuit board outside the sealant, the frame width of the display device is increased by the mounting area and a narrow frame of the display device is less likely to be achieved.

DISCLOSURE OF THE PRESENT INVENTION

The present invention was made in view of the above circumstances. An object is to achieve a narrow frame in a display device.

Means for Solving the Problem

A technology described in this specification is related to a display device including a display panel including a first substrate having thin film patterns on a section of a plate surface thereof and a second substrate that is bonded to the first substrate with sealant that is disposed to surround the thin film patterns, the display panel performing displaying, and a resin film having flexibility and configuring a section of the thin film patterns and extending outside the sealant continuously from the thin film patterns, the resin film having a section outside the sealant and at least the section having metal lines through which signals for driving the display panel are transmitted.

According to the above display device, the resin film has flexibility and the section thereof configures a part of the thin film patterns and continuously extends from the thin film patterns to the outside of the sealant. Other section of the resin film on which the metal lines are formed is configured as the flexible circuit board to which signals for driving the display device are transmitted. The resin film extends continuously from the section of the first substrate to the outside of the sealant. Therefore, the section of the resin film overlaps the sealant between the first substrate and the second substrate. Therefore, a mounting area for mounting the flexible circuit board is not required to be provided outside the sealant. In comparison to the known display device including the mounting area for the flexible circuit board outside the sealant, a narrower frame can be provided in the display device.

The above display device may further include a reinforcing resin film on at least a part of the section of the resin film outside the sealant to increase a thickness of the resin film and reinforce the resin film.

The section of the resin film that configures a part of the thin film patterns preferably has a small thickness from a viewpoint of reducing a thickness of the display panel. The section of the resin film outside the sealant is required to have a great thickness ensuring sufficient strength. According to the above configuration, the strength of the section of the resin film outside the sealant can be ensured by the reinforcing resin film while reducing a thickness of the display panel.

The above display device may further include a resin material member having flexibility on a section of the resin film between the sealant and the reinforcing resin.

If the reinforcing resin film is disposed to be in contact with the sealant, the section of the resin film outside the sealant is less likely to be folded. The reinforcing resin film is preferably disposed away from the sealant. If the reinforcing resin film is disposed away from the sealant, the section of the resin film outside the sealant and near the sealant (hereinafter referred to as an edge section) has a small thickness and is less likely to have sufficient strength. According to the above configuration, the resin material member having flexibility is disposed between the sealant and the reinforcing resin film. The section of the resin film outside the sealant can be folded easily while ensuring the strength of the resin film at the edge section.

In the above display device, the first substrate may extend to a position overlapping the reinforcing resin film in a thickness direction of the first substrate.

According to such a configuration, the edge section is reinforced by the first substrate such that the strength of the resin film is further ensured.

In the above display device, the reinforcing resin film may be disposed continuously from the second substrate to a section of the resin film.

If the resin material member is disposed between the sealant and the reinforcing resin film, the resin material member may be removed from the resin film depending on the bonding strength between the resin material and the resin film when the section of the resin film outside the sealant is folded. With the above configuration, the section of the reinforcing resin film is disposed on the second substrate to be supported by the second substrate. Therefore, the strength of the resin film can be ensured at the edge section without providing the resin material between the sealant and the reinforcing resin film.

In the above display device, the display panel may include a display area and a non-display area within a panel surface area, the display area displaying images and the non-display area displaying no images, and the reinforcing resin may have a section positioned above the second substrate and the section overlaps only the non-display area in a thickness direction of the second substrate.

According to such a configuration, even if the section of the reinforcing resin film is disposed above the second substrate, the display quality of the display panel is not adversely affected and the strength of the resin film is ensured at the edge section.

In the above display device, the section of the resin film outside the sealant may be folded in an opposite side from the second substrate, and a gap may be provided between an end surface of the first substrate and a folded section of the resin film.

According to such a configuration, the end surface of the first substrate is not in contact with the folded section of the resin film by the gap. Therefore, the folded section of the resin film is less likely to be damaged by the end surface of the first substrate.

The above display device may further include a lighting device supplying light rays to the display panel, and one of the substrates may be fixed to the lighting device, and at least apart of the section of the resin film outside the sealant may be fixed to the lighting device.

According to such a configuration, the display device can be thinner compared to a configuration that the display panel or the section of the resin film that functions as the flexible circuit board is away from the backlight device. If the display panel or the section of the resin film that functions as the flexible circuit board is away from the lighting device, the section that functions as the flexible circuit board may be warped and damaged when the section that functions as the flexible circuit board is mounted on a casing of the display device during the production process of the display device. However, with the above configuration, the section that functions as the flexible circuit board is less likely to be damaged during the production process of the display device.

Another technology described in this specification is related to a method of producing a display device including a thin film forming process of forming thin film patterns including first metal lines and a resin film on one section of a first substrate and forming the resin film on another section of the first substrate, a line forming process of forming second metal lines on a section of the resin film to be directly connected to the first metal lines, a bonding process of disposing sealant on the first substrate to surround the thin film patterns and such that the resin film is disposed inside and outside a surrounded area, and bonding the first substrate and a second substrate opposite each other with the sealant after the line forming process, a second substrate removing process of removing a section of the second substrate outside the sealant after the bonding process, and a first substrate removing process of separating and removing at least a part of a section of the first substrate outside the sealant from the resin film after the bonding process.

According to the above described method of producing a display device, the thin film patterns including the first metal lines and the resin film are formed in the section of the first substrate in the pattern forming process. If the thin film transistors are configured with the thin film patterns, the sections of the metal lines are configured as the gate electrodes of the thin film transistors. The section of the resin film formed on the section of the first substrate is configured as the interlayer insulating film formed on each thin film transistor. The second metal lines that are directly connected to the first metal lines are formed on the section of the resin film in the line forming process. The section of the resin film formed on other section of the first substrate is configured as the flexible circuit board for transmitting the signals for driving the produced display device.

The bonding process is performed after the other processes. The sealant can be applied such that the section of the resin film to be the flexible circuit board is located at a position inside the sealant or near the sealant (including a position overlapping the sealant in the thickness direction of the first substrate). In the second substrate removing process and the first substrate removing process, large sections of the first substrate and the second substrate outside the sealant can be removed without maintaining mounting areas for mounting the flexible circuit board outside the sealant as in the known technology. In comparison to the known liquid crystal display device including the mounting area for mounting the flexible circuit board outside the sealant, the frame width of the display device can be reduced.

In the above method of producing a display device, in the thin film forming process, the resin film may be formed continuously on the one section of the first substrate and the other section of the first substrate, and in the bonding process, the sealant may be applied onto the first substrate such that the one section of the resin film extends outside the surrounded area.

According to such a method, the resin film formed on the section of the first substrate and the resin film formed on other section of the first substrate are collectively formed. Compared to a configuration in which the resin films are separately formed, the resin film forming process is simplified.

In the above method of producing a display device, in the first substrate removing process, the first substrate may be further removed at a section overlapping the sealant in a thickness direction of the first substrate.

According to such a method, if the section of the resin film outside the sealant is folded to an opposite side from the second substrate, a gap is likely to be provided between the end surface of the first substrate and the folded section of the resin film. The folded section of the resin film is less likely to be damaged by the end surface of the first substrate.

In the above method of producing a display device, in the thin film forming process, the resin film may be formed on the first substrate such that a mounting area for mounting a driver component that drives the display device is provided on an opposite side from an area for forming the thin film patterns on the first substrate, at least a section of the resin film may be between the mounting area and the area. The method may further include a mounting process of mounting the driver component on the mounting area on the first substrate provided in the thin film forming process after the second substrate removing process, and in the first substrate removing process, at least a section of an area of the first substrate except for the mounting area provided in the thin film forming process may be removed.

According to such a method, in the mounting process, the driver component is mounted in the area of the first substrate provided in the thin film forming process, and at least a part of the section of the first substrate outside the sealant and except for the section having the driver component is removed from the section of the first substrate outside the sealant in the first substrate removing process. Accordingly, after the first substrate removing process, the resin film positioned between the sealant and the driver component can be warped and folded. Therefore, the driver component can be mounted by the COG mounting method on the first substrate without having need for providing the mounting area for the driver component outside the sealant. The display device having a narrower frame can be produced.

Advantageous Effect of the Invention

According to the present invention, a narrow frame is achieved in a display device.

MODES FOR CARRYING OUT THE INVENTION

First Embodiment

Figure 1:
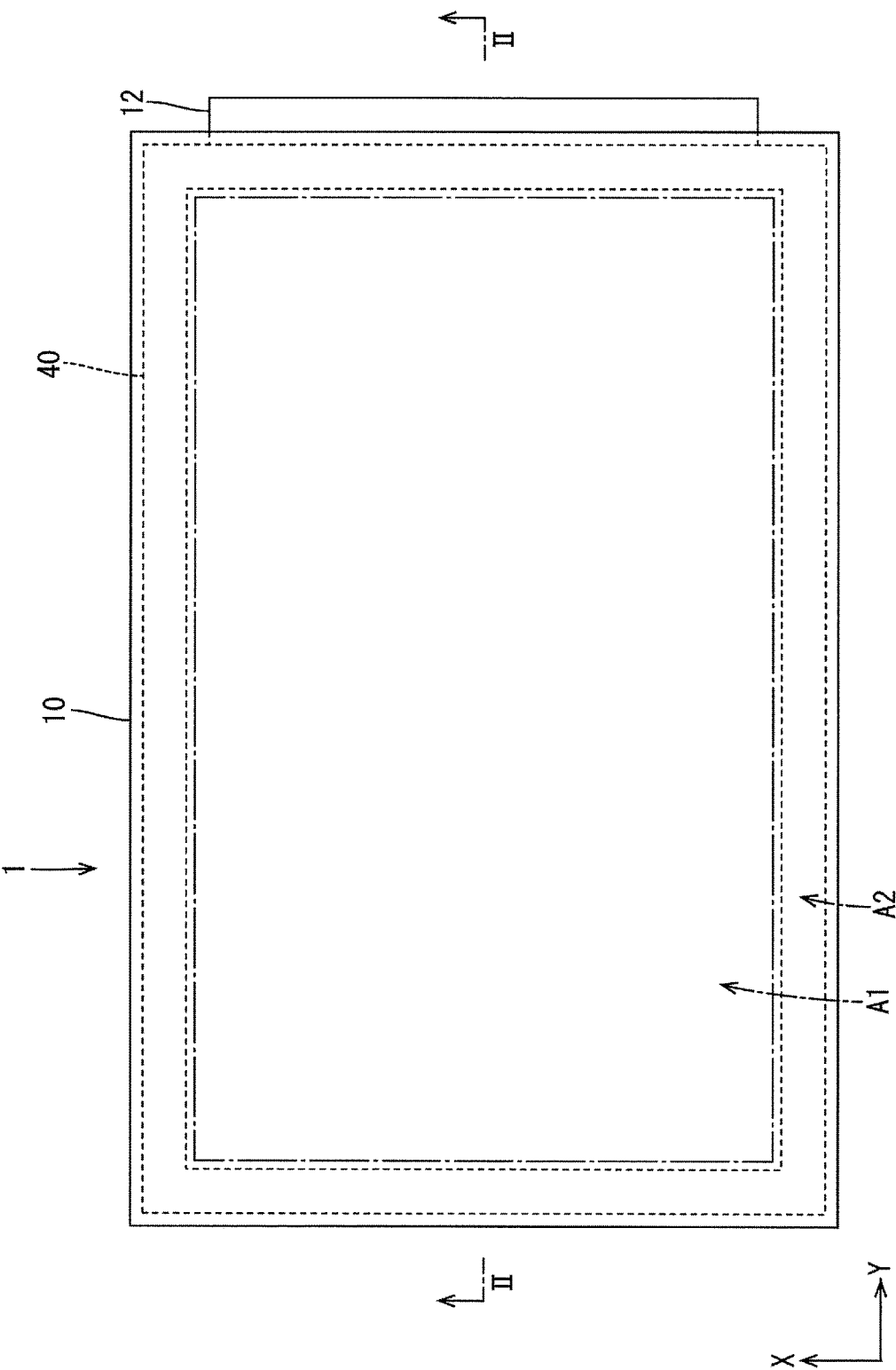
FIG. 1 is a schematic plan view of a liquid crystal display device according to a first embodiment.

A first embodiment of the present invention will be described with reference to FIGS. 1 to 11. In this section, a liquid crystal display device (an example of a display device) 1 and a method of producing the liquid crystal display device 1 will be described. X-axes, Y-axes, and Z-axes may be provided in the drawings. The axes in each drawing correspond to the respective axes in other drawings to indicate the respective directions. An upper side in in each cross-sectional view corresponds to an upper side (a front side) of the liquid crystal display device 1.

First, a configuration of the liquid crystal panel 1 and a configuration of a liquid crystal panel 10 will be described. As illustrated in FIG. 1, the liquid crystal display device 1 described in this section includes the liquid crystal panel 10 (an example of a display panel) and a backlight unit (not illustrated). The liquid crystal panel 10 has a rectangular shape in a plan view. The backlight unit is mounted in the back side portion of the liquid crystal panel 10 and configured to supply light to the liquid crystal panel 10. A large section of the liquid crystal panel 10 is configured as a display area A1 (an area defined by a chain line in FIG. 1). The display area A1 is a horizontally-long area in which images are displayed. A frame-shaped section outside the display area A1 is configured as a non-display area A2 in which images are not displayed. The frame-shaped non-display area A2 is a frame section of the liquid crystal panel 10.

A resin film 12 extends from a first end of the liquid crystal panel 10 in the Y-axis direction (on the right side in FIG. 1). The extended section of the resin film 12 extending outside the liquid crystal panel 10 is folded to the backside of the backlight unit. A second end of the flexible circuit board is connected to a control circuit board, which is not illustrated. An IC chip, which is not illustrated, is mounted on the control circuit board. The IC chip is an electronic component for driving the liquid crystal panel 10. The control circuit board is a circuit board for supplying various kinds of input signals to the IC chip. The resin film 12 has flexibility. The resin film 12 is made of yellow opaque resin material containing polyimide as a main component. The resin film 12 is a circuit board that connects the control circuit board and the IC chip to the liquid crystal panel 10 for transmitting the signals from the IC chip to the liquid crystal panel 10.

Figure 2:
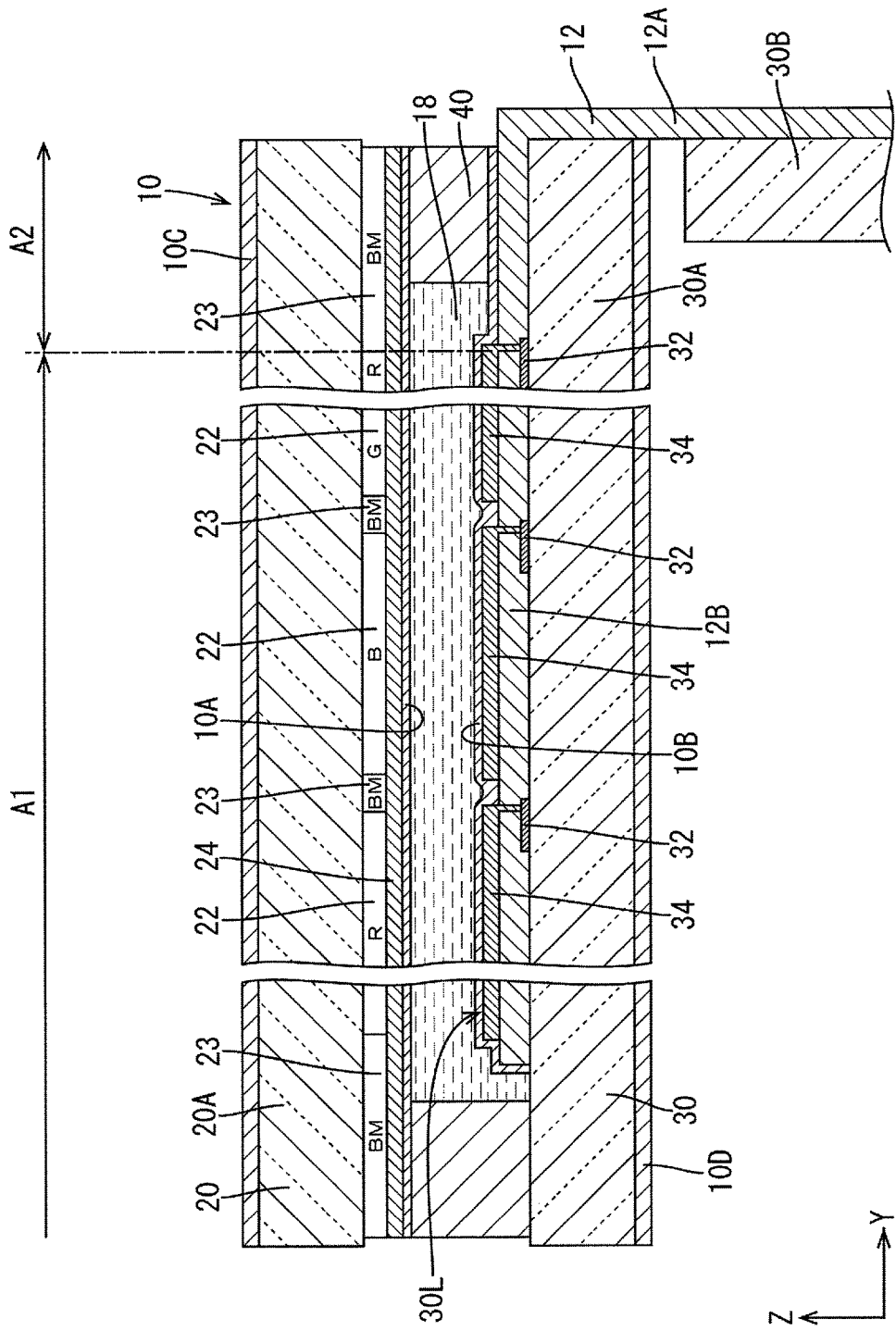
FIG. 2 is a schematic cross-sectional view of a liquid crystal panel illustrating a cross-sectional configuration along line II-II in FIG. 1.

A driving type of the liquid crystal panel 10 is a twisted nematic (TN) type. As illustrated in FIGS. 1 and 2, the liquid crystal panel 10 includes a pair of glass boards 20 and 30 having high light transmissivity and a liquid crystal layer including liquid crystal molecules. The liquid crystal molecules are substances having optical characteristics that change according to an application of an electrical field. The boards 20 and 30 of the liquid crystal panel 10 are bonded together with a cell gap corresponding to a thickness of the liquid crystal layer 18 with an ultraviolet curable type sealant 40. The sealant 40 is in a form of rectangle along outlines of the boards 20 and 30 to surround the liquid crystal layer 18 and thin film patterns 30L. A part of the resin film 12 configures a part of the thin film patterns 30L extends continuously from the thin film patterns 30 to the outside of the sealant 40. A section except for the part configuring the part of the thin film patterns 30L is a flexible circuit board section 12A.

The one of the boards 20 and 30 of the liquid crystal panel 10 on the front side is the color filter board 20 and the other on the rear side (the back side) is the array board 30. The color filter board 20 and the array board 30 have dimensions in the X-axis direction about equal to each other and dimensions in the Y-axis direction about equal to each other. Alignment films 10A and 10B for orienting the liquid crystal molecules in the liquid crystal layer 18 are formed on inner surfaces of the boards 20 and 30, respectively. Polarizing plates 10C and 10D are attached to an outer surface of a first glass substrate 20A (an example of a second substrate) included in the color filter board 20 and an outer surface of a second glass substrate 30A (an example of a first substrate) included in the array board 30, respectively. In this embodiment, a section of the resin film 12 outside the sealant 40 is folded and extended downward and an extended section is in contact with an end surface of the second glass substrate 30A. An end of the folded section of the resin film 12 is connected to a third glass substrate 30B that is made of the same material and has a same thickness as the second glass substrate 30A. The control circuit board is connected to the third glass substrate 30B.

The thin film patterns 30L are formed on the inner surface of the second glass substrate 30A (on the liquid crystal layer 18 side) of the array board 30. The thin film patterns 30L include multiple thin film patterns in layers. Specifically, the thin film patterns 30L include thin film patterns of TFTs 32 that are switching components, thin film patterns of pixel electrodes 34 that are formed on the respective TFTs 32, and thin film patterns of gate lines 36G (an example of first metal lines, see FIG. 3) and source lines that are routed in a grid to surround the TFTs 32 and the pixel electrodes 34. A section of the resin film 12 that is on the TFTs 32 (a section configuring a part of the thin film patterns 30L) is an interlayer insulating film 39 that is between the TFTs 32 and the pixel electrodes 32. Capacitive lines that extend parallel to the gate lines 36G are also routed around the TFTs 32 and the pixel electrodes 34.

The pixel electrodes 34 are made of a transparent electrode film such as an indium tin oxide (ITO) film. The pixel electrodes 34 are connected to the TFTs 32 and arranged in a matrix in a plan view. The gate lines 36G are metal lines formed from a metal film and patterned on the second glass substrate 30A. The gate lines 36G extend such that a first end thereof overlaps the sealant 40 in the Z-axis direction. The source lines are metal lines formed from a metal film and patterned in a layer above the gate lines 36G with a gate insulator film 38G therebetween. The gate insulator film 38G is made of transparent inorganic material (e.g., silicon oxide film) and patterned to cover entire surfaces of the gate lines 36G to insulate the gate lines 36G from the outside.

Figure 3:
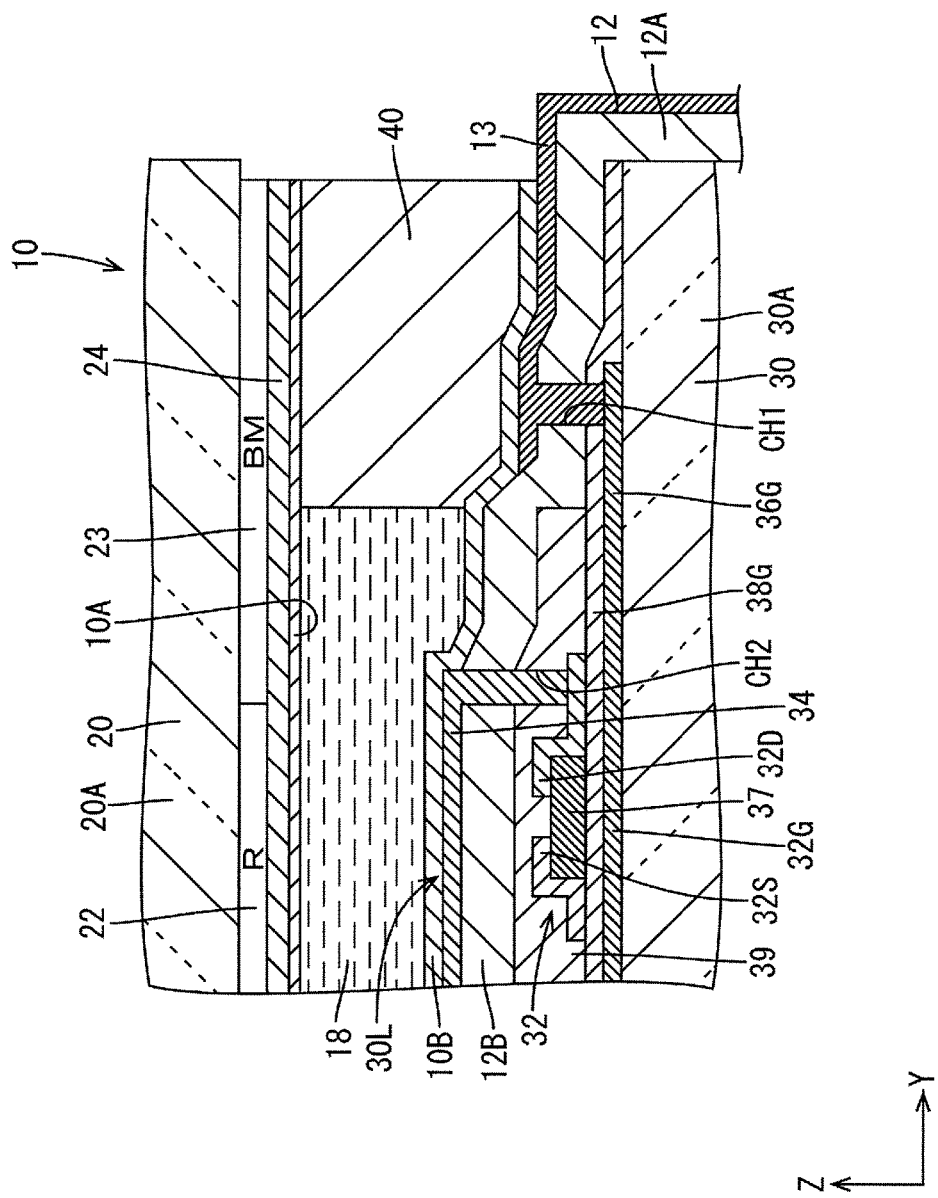
FIG. 3 is a magnified cross-sectional view of the liquid crystal panel illustrating a section near a sealant.

As illustrated in FIG. 3, connection lines 13 are formed on a section of the resin film 12 outside the sealant 40 and overlapping the sealant 40 in the Z-axis direction. The connection lines 13 are connected to the gate lines 36G. The resin film 12 and the gate insulator film 38G include first contact holes CH1 at sections thereof overlapping the first end of the gate lines 36G. The first contact holes CH1 are through holes that open in the top-bottom direction. The gate lines 36G are exposed through the first contact holes CH1. The connection lines 13 are formed on the section of the resin film 12 to be disposed within each first contact hole CH1. According to such a configuration, the first ends of the connection lines 13 are directly connected to the gate lines 36G via the first contact holes CH1 and are electrically connected to the gate lines 36G. Another ends of the connection lines 13 are electrically connected to the control circuit board.

Next, the TFTs 32 that are the switching components on the array board 30 will be described. Sections of the gate lines 36G overlapping the TFTs 32 in the Z-axis direction are configured as gate electrodes 32G of the TFTs 32. As illustrated in FIG. 3, the TFTs 32 are disposed in a layer above the gate electrodes 32G. Sections of the source lines overlapping the TFTs 32 in the Z-axis direction are configured as source electrodes 32S of the TFTs 32. The TFTs 32 include drain electrodes 32D opposed to the source electrodes 32S with predetermined gaps therebetween in the Y-axis direction to form an island pattern. The drain electrodes 32D are made of the same material as that of the source lines and formed on the array board 30 by patterning in the same process as the source electrodes during a process of producing the array board 30.

As illustrated in FIG. 3, in each TFT 32, a semiconductor film 37 is formed on the gate insulator film 38G to connect the source electrode 32S to the drain electrode 32D. The semiconductor film 37 may be an amorphous silicon (a-Si) semiconductor film, a low temperature polysilicon (LTPS) semiconductor film, an oxide semiconductor film, or another kind of semiconductor film. The source electrode 32S and the drain electrode 32D are opposed to each other with the predefined gap therebetween and not directly electrically connected to each other. The source electrode 32S and the drain electrode 32D are electrically connected to each other via the semiconductor film in the layer below them. A bridging section of the semiconductor film 37 between the electrodes 32S and 32D functions as a channel through which a drain current flows. In a layer above the electrodes 32S and 32D and the semiconductor film 37, a protective insulator film 39 is formed to cover the electrodes 32S and 32D and the semiconductor film 37. The protective insulator film 39 is made of transparent inorganic material.

As illustrated in FIG. 3, the resin film 12 is formed on the protective insulator film 39 to cover the protective insulator film 39. The section of the resin film 12 covering the protective insulator film 39 functions as a planarization film for planarizing surfaces of the TFTs 32. The protective insulator film 39 and the resin film 12 include second contact holes CH2 at sections thereof overlapping a section of the drain electrodes 32 in the Z-axis direction. The second contact holes CH2 are through holes that open in the top-bottom direction. The drain electrodes 32D are exposed through the second contact holes CH2. The pixel electrodes 34 are formed on the section of the resin film 12 to be disposed within each second contact hole CH2. The pixel electrode 34 is connected to the drain electrode 32D via the second contact hole CH2. With the configuration that the pixel electrode 34 is connected to the drain electrode 32D, if a voltage is applied to the gate electrode 32G of the TFT 32 (the TFT 32 is turned on), a current flows between the source electrode 32S and the drain electrode 32D via the channel and a predefined voltage is applied to the pixel electrode 34.

The source lines and the capacitive lines are connected to the gate lines 36G via contact holes, which are not illustrated. A reference voltage or signals are input from the control circuit board to the gate lines 36G, the source lines, and the capacitive lines via the connection liens 13 patterned on the resin film 12. With the reference voltage and the signals, the driving of the TFTs 32 is controlled. In this specification, the connection lines 13 and the gate lines 36G are metal lines and are directly connected to each other within the first contact holes CH1. Therefore, proper electrical connection is established between the control circuit board and the thin film patterns 30L formed on the array board 30 via the connection lines 13 and the gate lines 30G.

Next, a configuration of the color filter board 20 in the display area A1 of the liquid crystal panel 10 will be described. As illustrated in FIG. 2, color filters 22 are disposed on the inner surface of the first glass substrate 20A (on the liquid crystal layer 18 side) of the color filter board 20 at positions overlapping the pixel electrodes 34 of the array board 30 in the plan view. The color filters 22 are arranged in a matrix. The color filters 22 include red (R), green (G), and blue (B) color sections. A light blocking section 23 (a black matrix) for reducing color mixture is formed in a grid among the color sections of the color filters 22. The light blocking section 23 overlaps the gate lines 36G, the source lines, and the capacitive lines on the array board 30 in the plan view.

In the liquid crystal panel 10, a red (R) color section, a green (G) color section, a blue (B) color section, and three pixel electrodes 34 opposed to them form a single display pixel, which is a display unit. The display pixel includes a red pixel including the R color section, a green pixel including the G color section, and a blue pixel including the B color section. Pixels in those colors are repeatedly arranged in the row direction (the X-axis direction) on a plate surface of the liquid crystal panel 10 to form lines of pixels. The lines of pixels are arranged in the column direction (the Y-axis direction). As illustrated in FIG. 2, a counter electrode 24 is formed on inner surfaces of color filters 22 and light blocking sections 23 to be opposed to the pixel electrodes 34 on the array board 30. The counter electrode is connected to a counter electrode line, which is not illustrated, in the non-display area A2 of the liquid crystal panel 10. A reference voltage is applied to the counter electrode 24 via the counter electrode line. By controlling the voltage applied to the pixel electrodes 34 by the TFTs 32, a predefined voltage difference is produced between the pixel electrodes 34 and the counter electrode 24.

In the liquid crystal display device of this embodiment, as described before, the resin film 12 has flexibility and the section thereof configures a part of the thin film patterns 30L and continuously extends from the thin film patterns 30 to the outside of the sealant 40. According to such a configuration, the section of the resin film 12 disposed on the section of the second glass substrate 30A is configured as the interlayer insulating film 12B that configures the section of the thin film patterns 30L. Other section of the resin film 12 other than the interlayer insulating film 12B, that is, the section on which the connection lines 13 are formed is configured as the flexible circuit board 12A to which signals for driving the liquid crystal display device 1 are transmitted.

In the liquid crystal panel 10 of this embodiment, the resin film 12 extends continuously from the section of the second glass substrate 30A to the outside of the sealant 40. Therefore, the section of the resin film 12 overlaps the sealant 40 between the second glass substrate 30A and the first glass substrate 20A. Therefore, a mounting area for mounting the flexible circuit board is not required to be provided outside the sealant 40. In comparison to the known liquid crystal display device including the mounting area for the flexible circuit board outside the sealant, a narrower frame can be provided in the liquid crystal display device 1.

Figure 4:
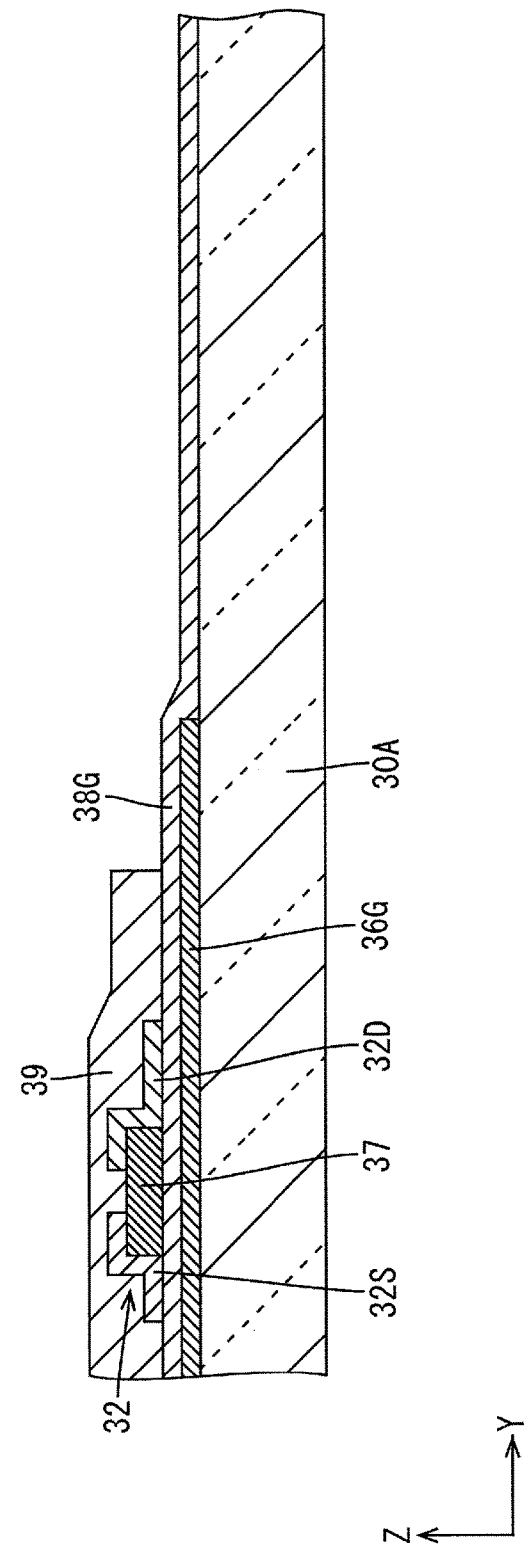
FIG. 4 is a cross-sectional view illustrating process (1) of a method of producing the liquid crystal display device according to the first embodiment.

The configuration of the liquid crystal panel 10 according to this embodiment is described above. Next, the method of producing the liquid crystal panel 10 having the configuration described above. When a patterned thin film is formed in a flowing sequence, the known photolithography method is used. In this section, in a process of producing the array board 30, as illustrated in FIG. 4, the gate lines 36G are formed through pattering on one of the sections of the second glass substrate 30A and the gate insulator film 38G is formed to cover the gate lines 36G through patterning. The source lines and the semiconductor film 37 are formed on a section of the gate insulator film 38G through patterning to form the TFTs 32 in sections of the second glass substrate 30A. Sections of the gate lines 36G formed through patterned and overlapping the TFTs 32 are configured as the gate electrodes 32G. Sections of the source lines formed through patterned and overlapping the TFTs 32 are configured as the source electrodes 32S or the drain electrodes 32D.

Figure 5:
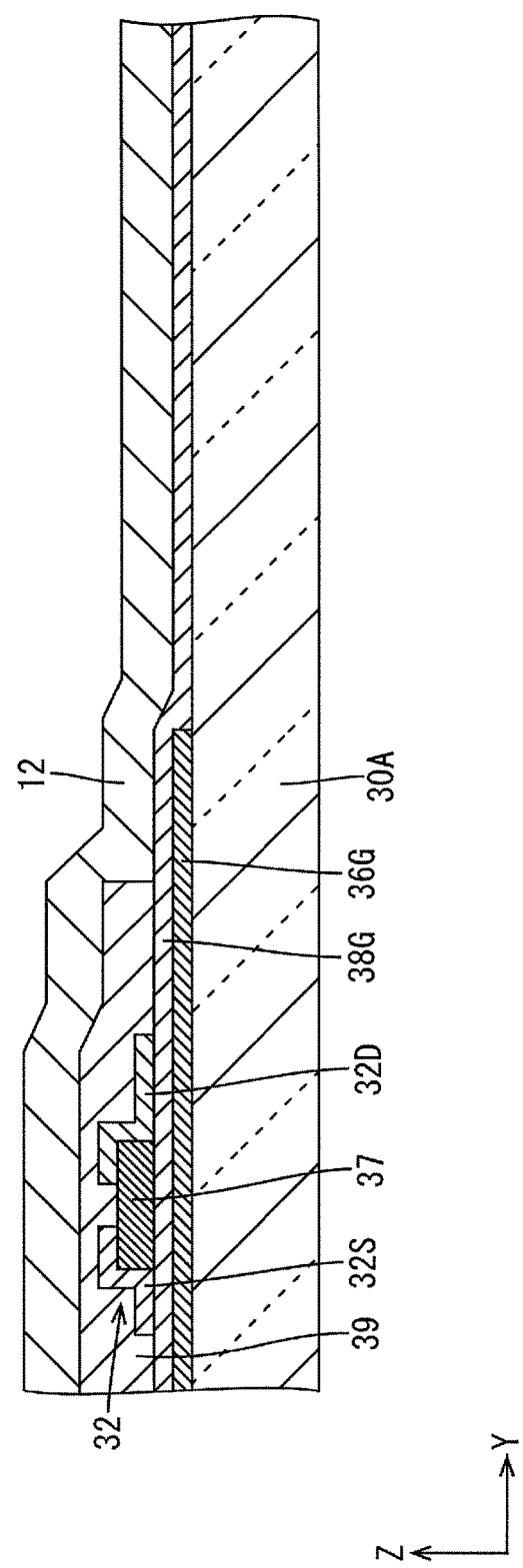
FIG. 5 is a cross-sectional view illustrating process (2) of a method of producing the liquid crystal display device according to the first embodiment.
Figure 6:
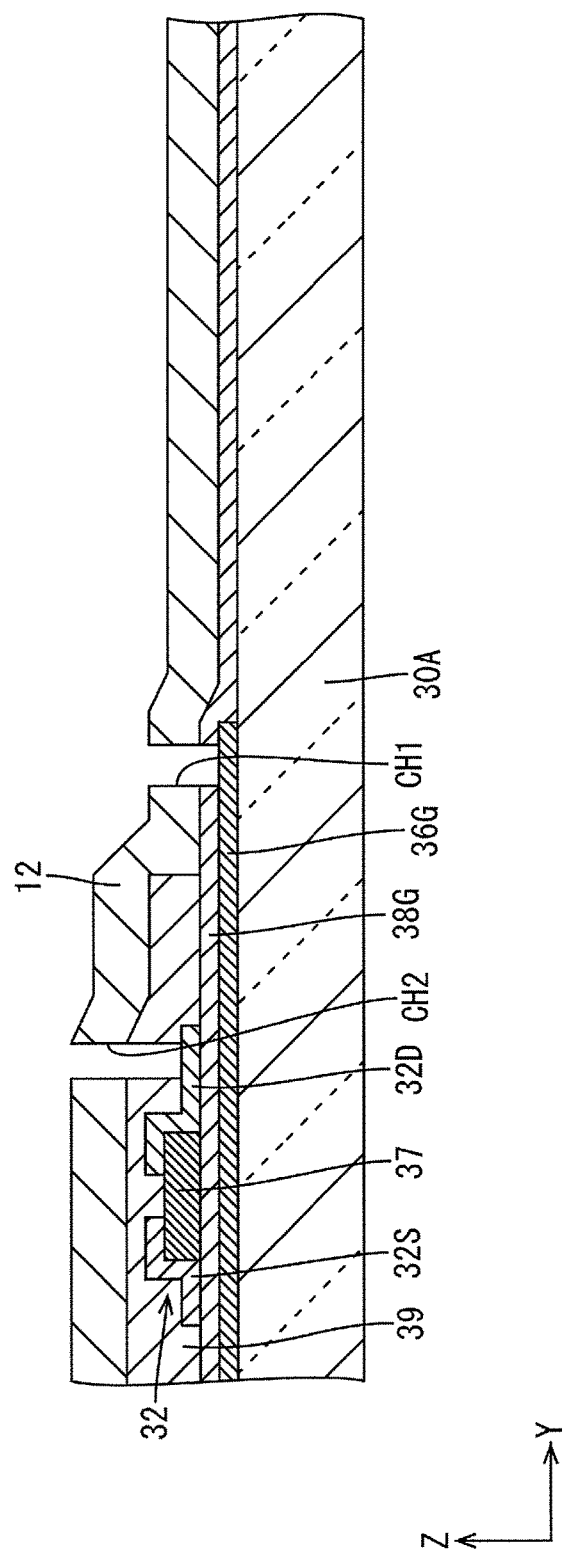
FIG. 6 is a cross-sectional view illustrating process (3) of the method of producing the liquid crystal display device according to the first embodiment.
Figure 7:
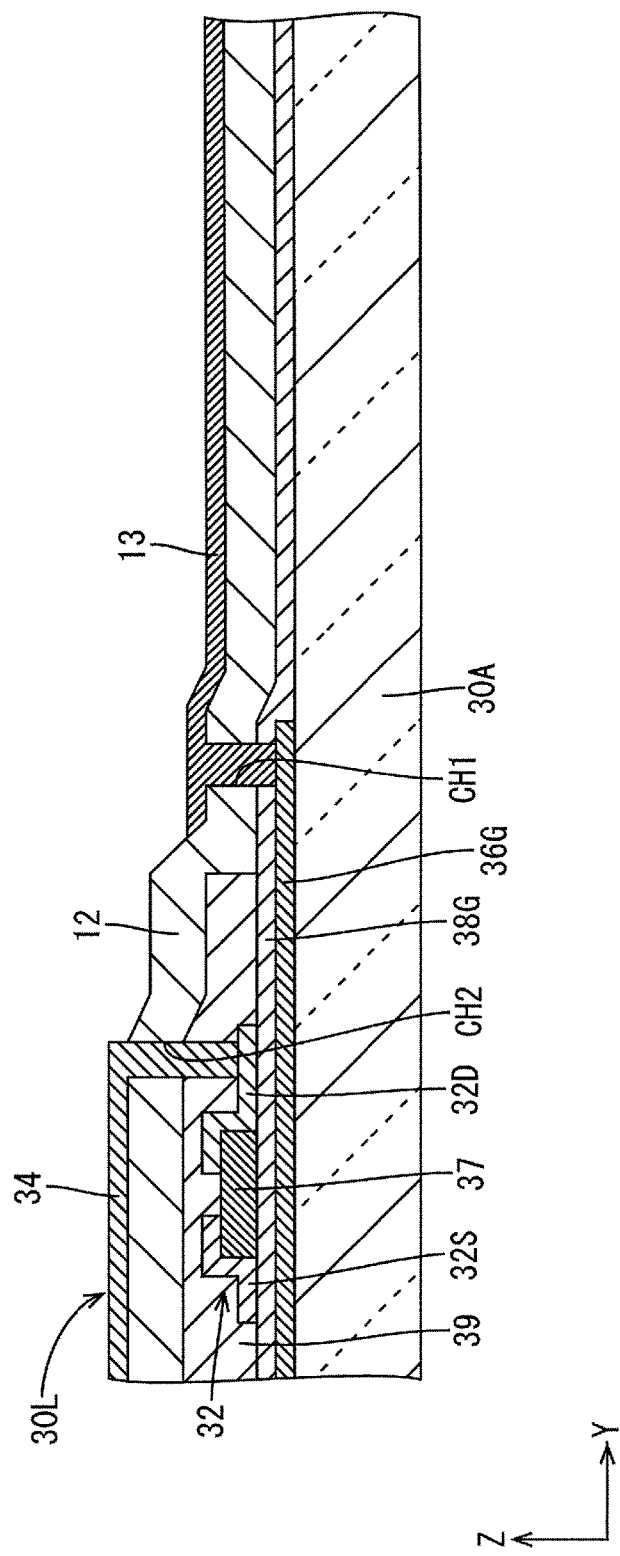
FIG. 7 is a cross-sectional view illustrating process (4) of the method of producing the liquid crystal display device according to the first embodiment.

Next, the protective insulator film 39 is formed through patterning to cover the TFTs 32. Then, as illustrated in FIG. 5, the resin film 12 made of a transparent polyimide film is formed on the gate insulator film 38G continuously from the one section of the second glass substrate 30A to another section of the second glass substrate 30A. The surface on the TFTs 32 side is planarized by the resin film 12. Next, as illustrated in FIG. 6, the first contact holes CH1 are formed in the sections of the resin film 12 and the gate insulator film 38G. The first contact holes CH1 are through holes that open in the top-bottom direction. First ends of the gate lines 36G are exposed through the first contact holes CH1. The second contact holes CH2 are formed in the sections of the resin film 12 and the protective insulator film 39 to be through holes that open in the top-bottom direction. The section of each drain electrode 32D is exposed through the contact holes CH2.

Next, the connection lines 13 are formed on the section of the resin film 12 (a section above the second glass substrate 30A) to cross the first contact holes CH1 (a line forming process). According to such a configuration, the connection lines 13 are directly connected to the gate lines 36G. Next, the pixel electrodes 23 formed through patterning are formed on the section of the resin film (a section above the second glass substrate 30A) to cross each second contact hole CH2. Thus, the thin film patterns 30L including thin film patterns that are disposed in layers on the second glass substrate 30A included in the array board 30 (a thin film forming process). Thereafter, alignment film 10B is formed on the sections of the resin film 12 and the connection lines 13. Through the processes, the array board 30 is complete.

A method of producing the color filter board 20 will be briefly described. In a production process of the color filter board 20, the light blocking section 23 that is a thin film is formed on the first glass substrate 20A and processed into a grid by the photolithography method. The light blocking section 23 is made of titanium, for example. The color sections of the color filters 22 are formed at predefined positions. The counter electrode 24 is formed to cover the light blocking section 23 and the color filters 22. A transparent insulating film (not illustrated), which is a protective film, is formed to cover the counter electrode. The insulating film is made of silicon dioxide, for example. The alignment film 10A is formed on the surface of the insulating film. Through the above steps, the color filter board 20 is complete.

Figure 8:
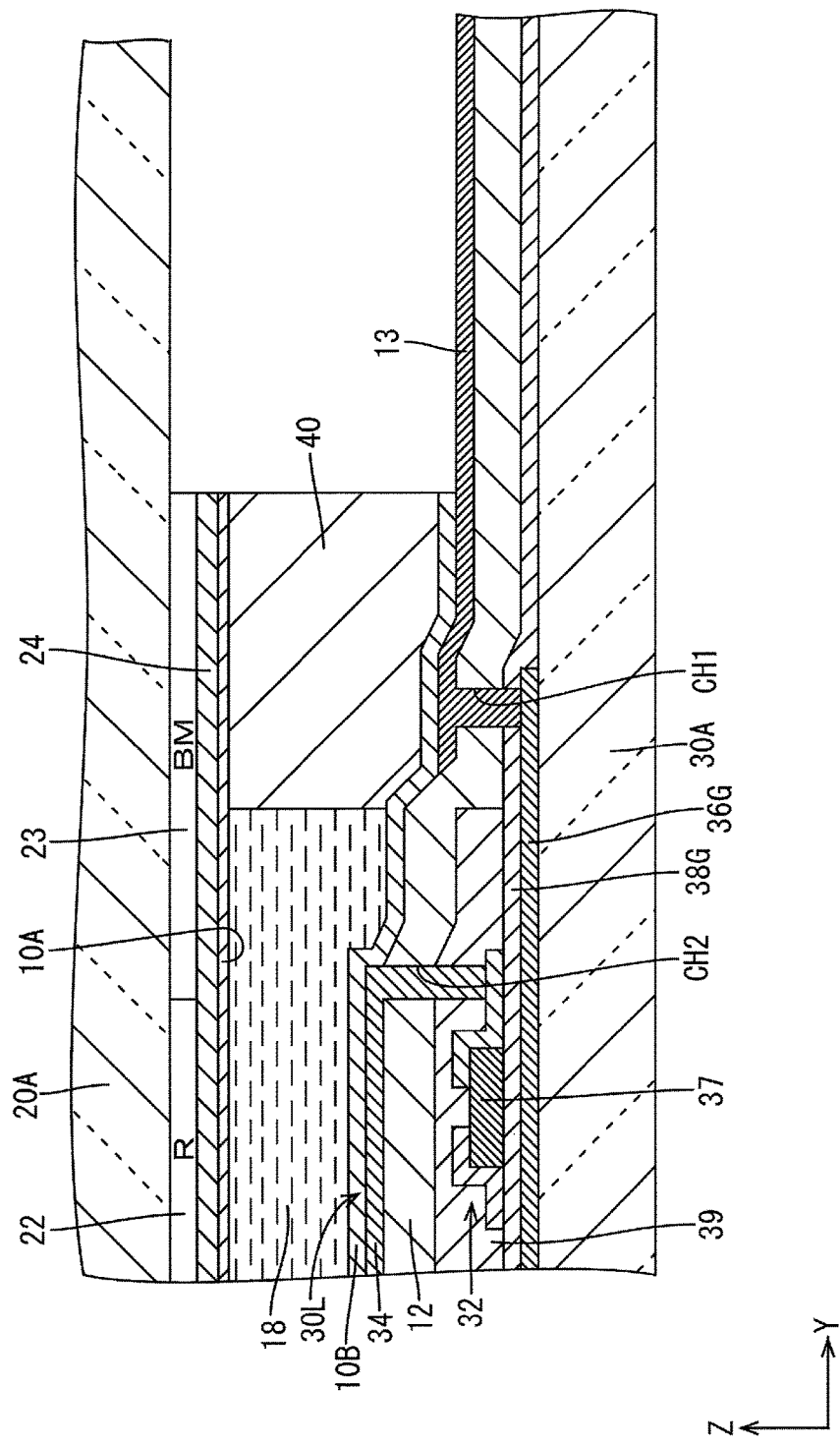
FIG. 8 is a cross-sectional view illustrating process (5) of the method of producing the liquid crystal display device according to the first embodiment.

When the array board 30 and the color filter board 20 are complete, the sealant 40 is applied onto the resin film 12 (on the second glass substrate 30A) in a form of a rectangle surrounding the thin film patterns 30 and such that a section of the resin film 12 extends outside the surrounded area. Specifically, as illustrated in FIG. 8, the sealant 40 is applied such that a section of the sealant 40 overlaps the first contact hole CH1 in the Z-axis direction (overlaps the first end of the gate lines 36G). The first glass substrate 20A of the color filter board 20 is set opposite the second glass substrate 30A and positioned such that the end surface of the first glass substrate 20A is aligned with the end surface of the second glass substrate 30A. The liquid crystals are injected into a section of the second glass substrate 30A surrounded by the sealant 40 by the one drop fill (ODF) method using a liquid crystal dropping device to form the liquid crystal layer 18. As illustrated in FIG. 8, the first glass substrate 20A is held opposite the second glass substrate 30A and bonded to the second glass substrate 30A with the sealant 40 (a bonding process).

Figure 9:
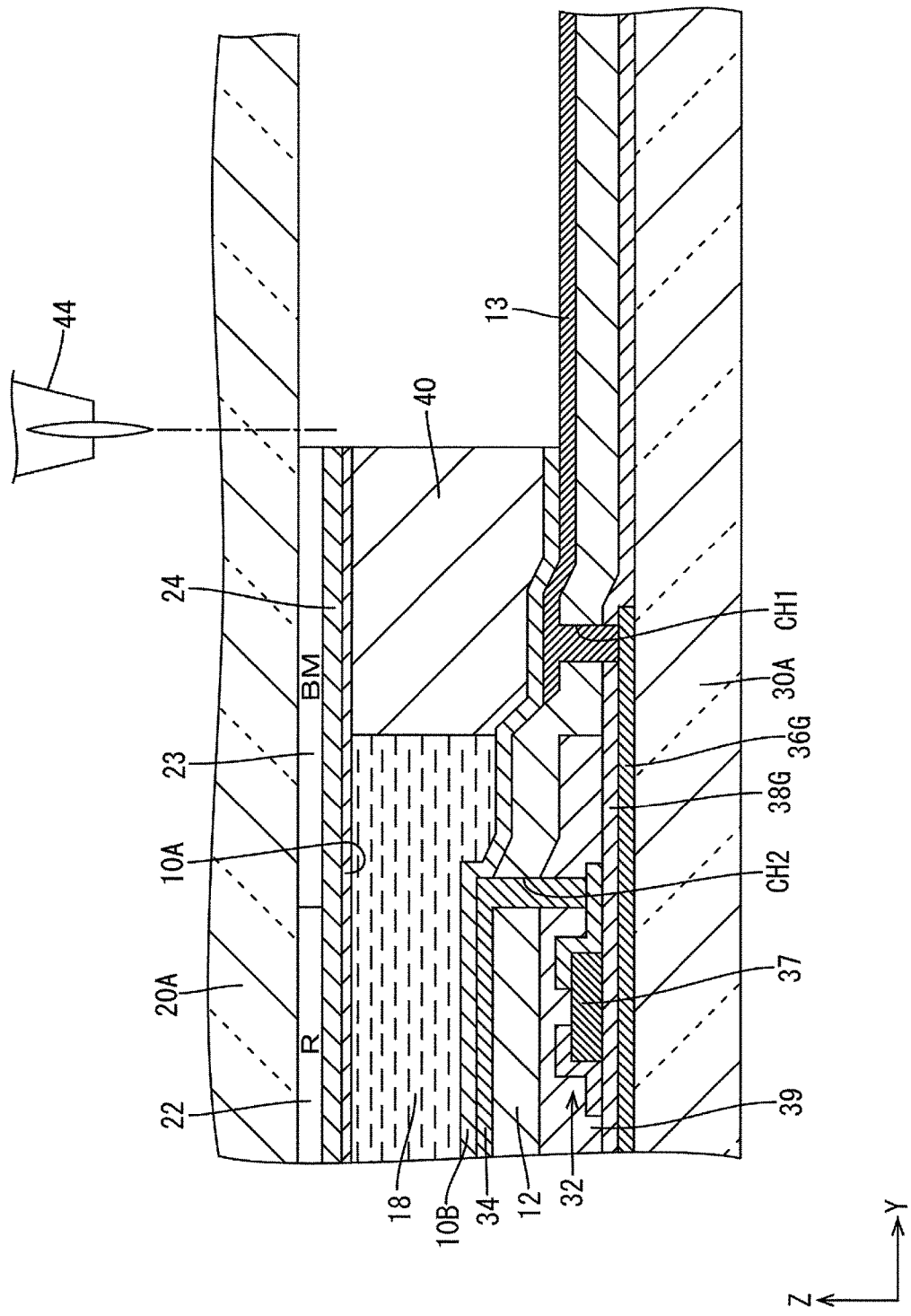
FIG. 9 is a cross-sectional view illustrating process (6) of the method of producing the liquid crystal display device according to the first embodiment.
Figure 10:
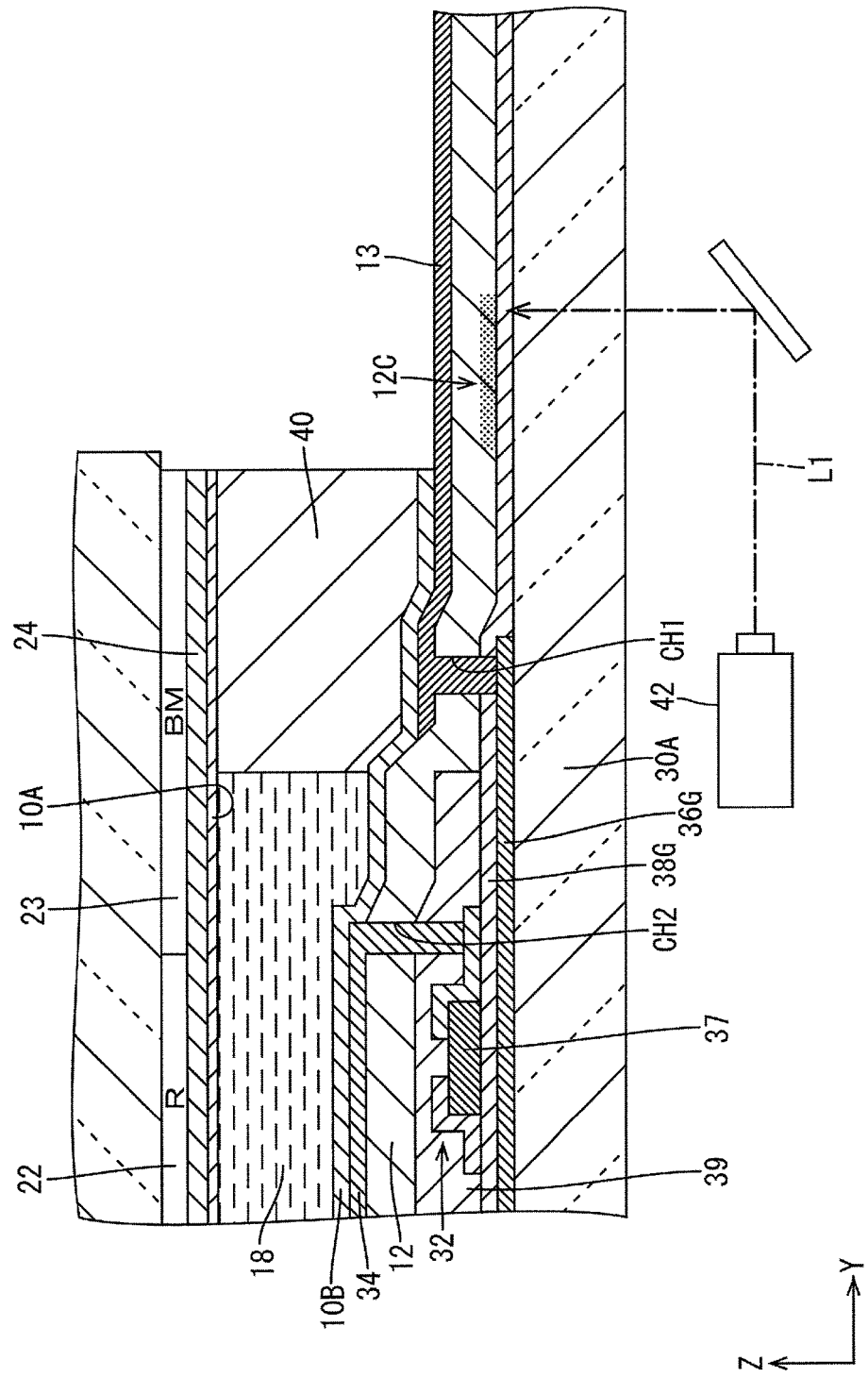
FIG. 10 is a cross-sectional view illustrating process (7) of the method of producing the liquid crystal display device according to the first embodiment.
Figure 11:
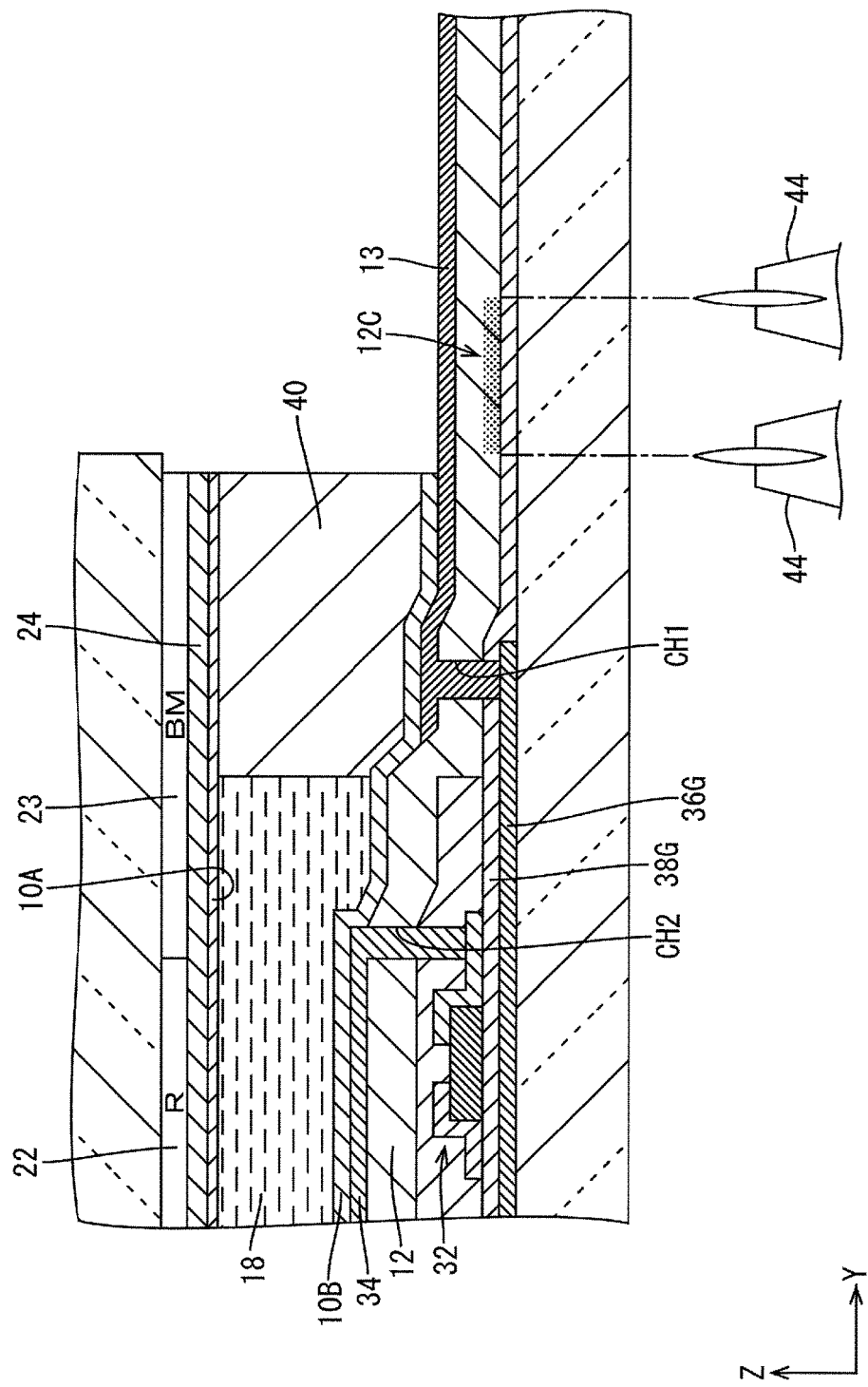
FIG. 11 is a cross-sectional view illustrating process (8) of the method of producing the liquid crystal display device according to the first embodiment.

As illustrated in FIG. 9, the first glass substrate 20A is cut at a boundary between a section outside the sealant 40 and other section using a scriber 44 to remove the section of the first glass substrate 20A outside the sealant 40 (a second substrate removing process). As illustrated in FIG. 10, a laser beam L1 is applied to a section of the boundary between the gate insulator film 38G and the resin film 12 outside the sealant 40 by a laser beam applying unit 42 (a laser beam applying process). As a result, a weak layer 12A is formed in a section of the resin film 12 to which the laser beam L1 is applied. As illustrated in FIG. 11, the second glass substrate 30A is cut at two boundary sections between the section to which the laser beam L1 is applied in the laser beam applying process and other section to separate and remove a portion between the two boundary sections of the second glass substrate 30A from the resin film 12 (the gate insulator film 38G) (a first substrate removing process). Accordingly, the section of the second glass substrate 30A is removed and a section of the second glass substrate 30A remaining outside the sealant 40 is configured as the third glass substrate 30B (see FIG. 2).

A section of the resin film 12 outside the sealant 40 is folded at about right angle to the plate surface of the second glass substrate 30A toward the back side (an opposite side from the first glass substrate 20A) (a folding process). The polarizing plates 10C and 10D are bonded to the outer surfaces of the glass substrates 20A and 30A and the control circuit board is connected to the third glass substrate 30B remaining outside the sealant 40. The ends of the connection lines 13 are connected to the control circuit board. The IC chip is mounted on the control circuit board. This completes the liquid crystal panel 10. The backlight unit is fixed to the back of the liquid crystal panel 10. This completes the liquid crystal display device 1 according to this embodiment. The section of the gate insulator film 38G outside the sealant 40 is not illustrated in FIG. 3.

As described above, in the method of producing the liquid crystal panel 10 in this embodiment, the thin film patterns 30L including the gate lines 36G and the section of the resin film 12 are formed in the section of the second glass substrate 30A in the pattern forming process. The sections of the gate lines 36G are configured as the gate electrodes 32G of the TFTs 32. The section of the resin film 12 formed on the section of the second glass substrate 30A is configured as the interlayer insulating film 12B formed on each TFT 32. The connection lines 13 that are directly connected to the gate lines 36G are formed on the section of the resin film 12 in the line forming process. The section of the resin film 12 formed on other section of the second glass substrate 30A is configured as the flexible circuit board 12A for transmitting the signals for driving the produced liquid crystal display device 1.

The bonding process is performed after the other processes. As described above, the sealant can be applied such that the section of the resin film 12 to be the flexible circuit board 12A is located at a position inside the sealant and overlapping the sealant in the Z-axis direction. In the second substrate removing process and the first substrate removing process, large sections of the first glass substrate 20A and the second glass substrate 30A outside the sealant 40 can be removed without maintaining mounting areas for mounting the flexible circuit board outside the sealant as in the known technology. In comparison to the known liquid crystal display device including the mounting area for mounting the flexible circuit board outside the sealant, the frame width of the liquid crystal display device 1 can be reduced.

In this embodiment, the resin film 12 formed on the section of the second glass substrate 30A and the resin film 12 formed on other section of the second glass substrate 30A are collectively formed. Compared to a configuration in which the resin films are separately formed, the resin film forming process is simplified.

Modification of First Embodiment

Figure 12:
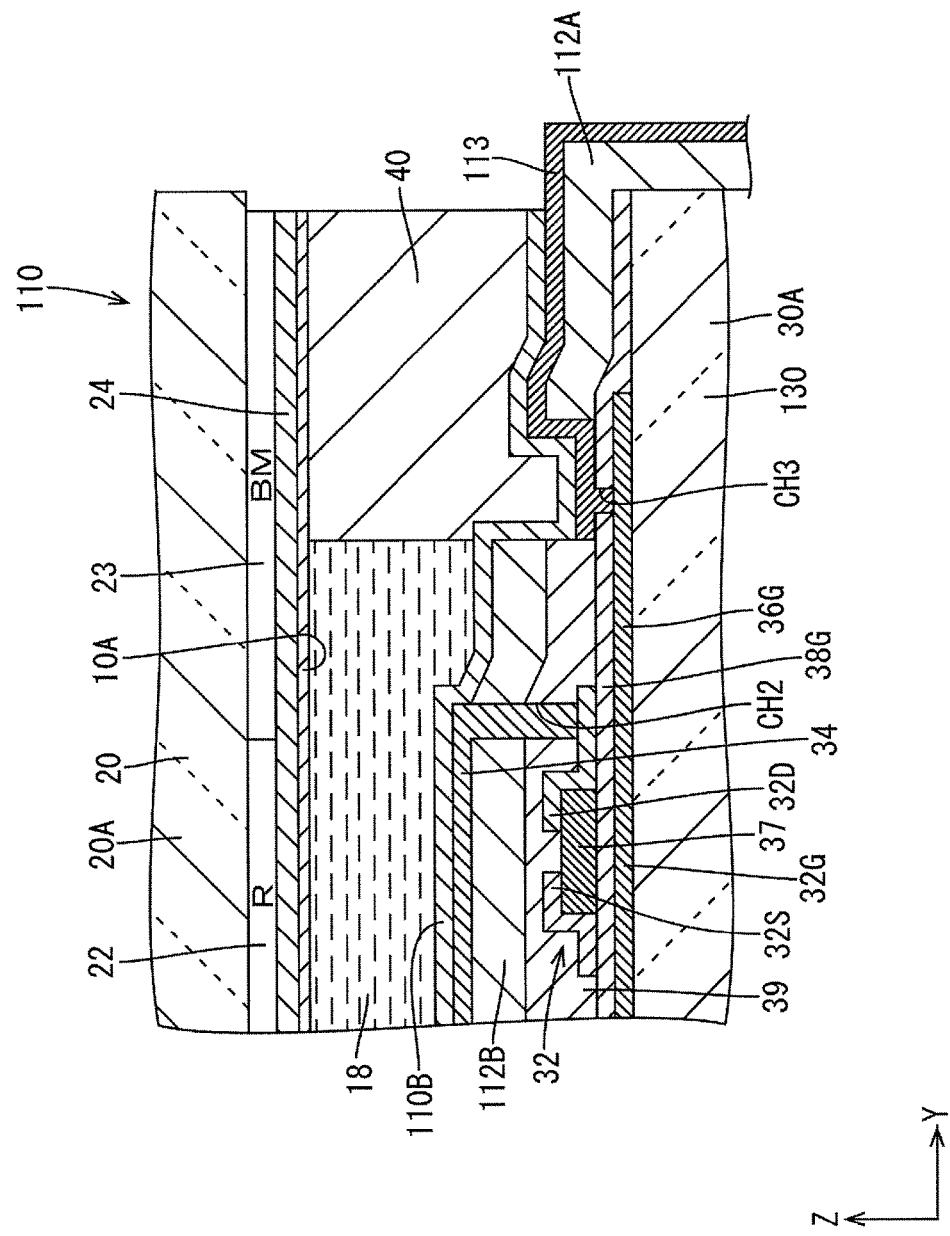
FIG. 12 is a magnified cross-sectional view of a liquid crystal display device according to a modification of the first embodiment.

A modification of the first embodiment will be described with reference to FIG. 12. A liquid crystal display device according to this modification includes two resin films 112A, 112B formed separately on the second glass substrate 30A, which differ from the first embodiment. Other configurations are similar to those of the liquid crystal display device described in the first embodiment section. In a liquid crystal panel 110 of this modification, as illustrated in FIG. 12, a first resin film 112A is disposed on a section of the gate insulator film 38G overlapping the sealant 40 in the Z-axis direction and outside the sealant and a second resin film 112B is disposed above the TFTs 32. The first resin film 112A is away from the second resin film 112B and the first resin film 112A functions as a flexible circuit board for transmitting signals from the IC chip to the liquid crystal panel 110 and the second resin film 112B functions as an interlayer insulating film that separates each TFT 32 from each pixel electrode 34. Connection lines 113 are disposed on the first resin film 112A.

The gate insulator film 38G includes third contact holes CH3 at sections thereof between the first resin film 112A and the second resin film 112B. The third contact holes CH3 are through holes that open in the top-bottom direction. First ends of the gate lines 36G are exposed through the third contact holes CH3. Connection lines 113 are formed to cross the third contact holes CH3. The first ends of the connection lines 113 are directly connected to the gate lines 36G via the third contact holes CH3 and are electrically connected to the gate lines 36G. Another ends of the connection lines 113 are electrically connected to the control circuit board.

The liquid crystal panel 110 having the above configuration according to this modification is produced with a following sequence. In the thin film forming process, the first resin film 112A and the second resin film 112B are formed in the same process to be away from each other and the third contact holes CH3 are formed between the first resin film 112A and the second resin film 112B. Other processes are same as those in the first embodiment. In this modification, even with the configuration including the first resin film 112A and the second resin film 112B that are away from each other, the section of the first resin film 112A that functions as the flexible circuit board is disposed to overlap the sealant 40 in the Z-axis direction. Therefore, compared to the known liquid crystal display device including the mounting area for the flexible circuit board outside the sealant 40, the liquid crystal display device including a narrow frame can be produced.

Second Embodiment

Figure 13:
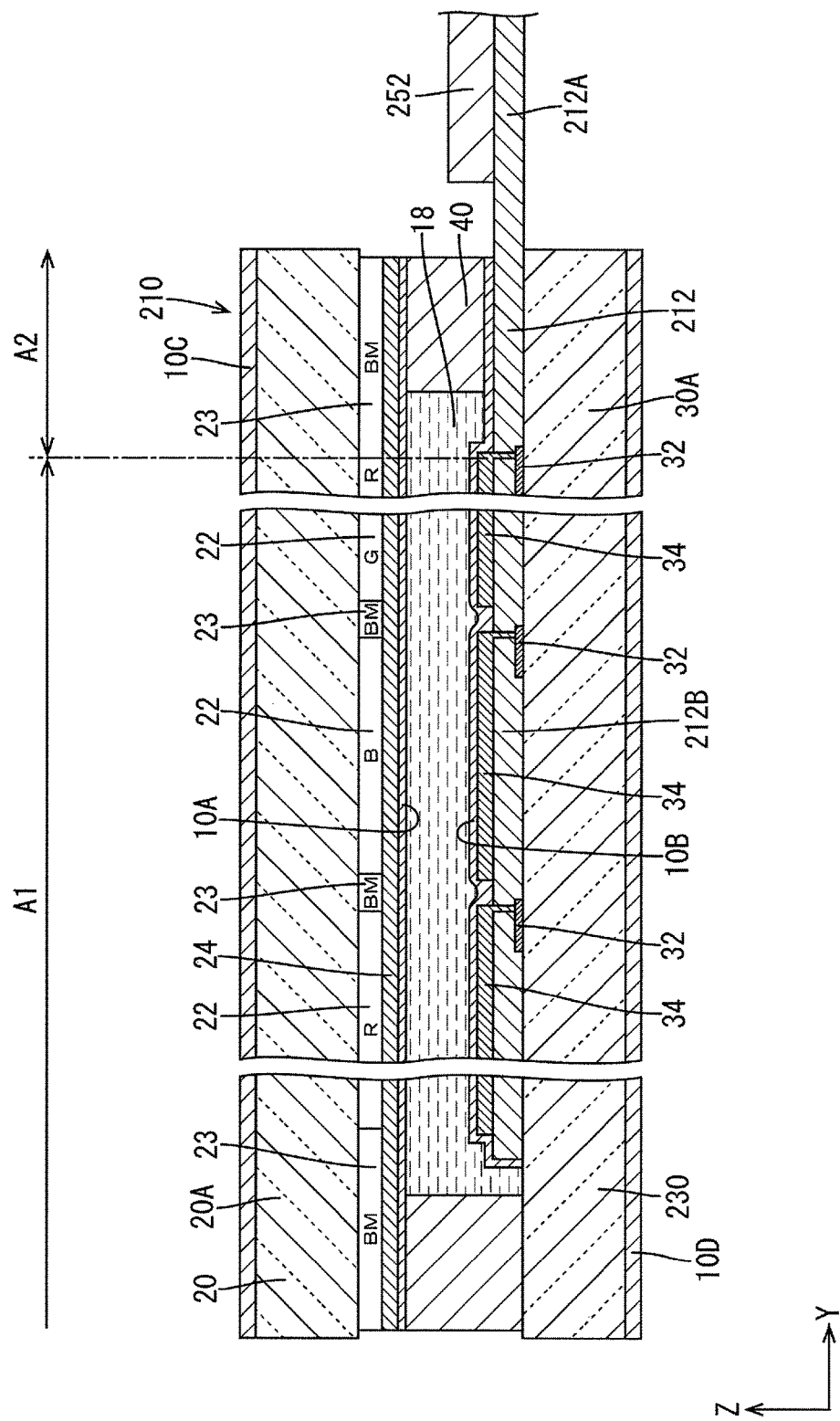
FIG. 13 is a schematic cross-sectional view of a liquid crystal panel according to a second embodiment.

A second embodiment will be described with reference to FIG. 13. In a liquid crystal display device according to this embodiment, a flexible circuit board 212A of a resin film 212 has a configuration different from the first embodiment. Other configurations are similar to those of the first embodiment and thus will not be described. As illustrated in FIG. 13, a liquid crystal panel 210 of this embodiment includes a reinforcing resin film 252 on a section of a resin film 212 outside the sealant 40. A thickness of the resin film 212 is increased by the reinforcing resin film 252 to reinforce the resin film 212 outside the sealant 40. A section of the resin film 212 having the reinforcing resin film 252 thereon has a thickness of 5 µm or more, for example.

The liquid crystal panel 210 having the above configuration of this embodiment is produced by bonding the reinforcing resin film 252 on the section of the resin film 212 outside the sealant 40 after the second substrate removing process and performing the first substrate removing process. The section of the resin film that configures a part of the thin film patterns (a section disposed above the TFTs) preferably has a small thickness from a viewpoint of reducing a thickness of the liquid crystal panel and easy connection between the drain electrodes and the pixel electrodes in the TFTs. The section of the resin film outside the sealant is required to have a great thickness ensuring sufficient strength. According to the configuration of this embodiment, the strength of the section of the resin film 212 outside the sealant 40 can be ensured by the reinforcing resin film 252 while reducing a thickness of the liquid crystal panel 210 and ensuring easy connection between the drain electrodes and the pixel electrodes 34 in the TFTs 32.

First Modification of Second Embodiment

Figure 14:
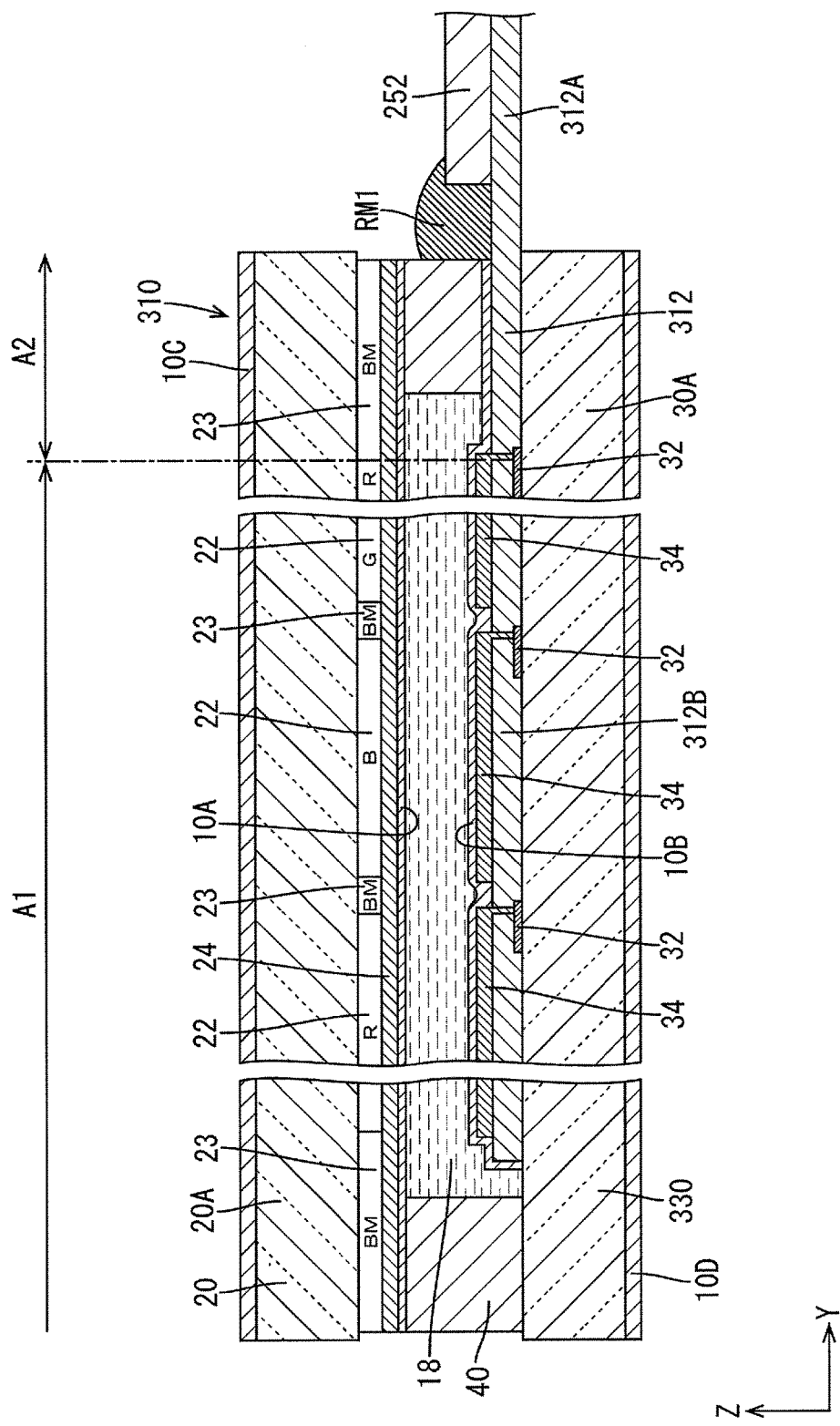
FIG. 14 is a schematic cross-sectional view of a liquid crystal panel according to a first modification of the second embodiment.

A first modification of the second embodiment will be described with reference to FIG. 14. In a liquid crystal display device according to this modification, a configuration of a flexible circuit board 212A of the resin film 212 differs from the second embodiment. Other configurations are similar to those of the liquid crystal display device described in the second embodiment section. In this modification, as illustrated in FIG. 14, first resin material member RM1 having flexibility is bonded to a section of a surface of a flexible circuit board 312A of a resin film 312 between the sealant 40 and the reinforcing resin film 252.

If the reinforcing resin film is disposed to be in contact with the sealant, the section of the resin film outside the sealant is less likely to be folded. The reinforcing resin film is preferably disposed away from the sealant. If the reinforcing resin film is disposed away from the sealant, the section of the resin film outside the sealant and near the sealant (hereinafter referred to as an edge section) has a small thickness and is less likely to have sufficient strength. According to the configuration of this modification, the first resin material member RM1 having flexibility is disposed between the sealant 40 and the reinforcing resin film 252. The section of the flexible circuit board 312A of the resin film 312 outside the sealant 40 can be folded easily while ensuring and the strength of the resin film 312 at the edge section.

Second Modification of Second Embodiment

Figure 15:
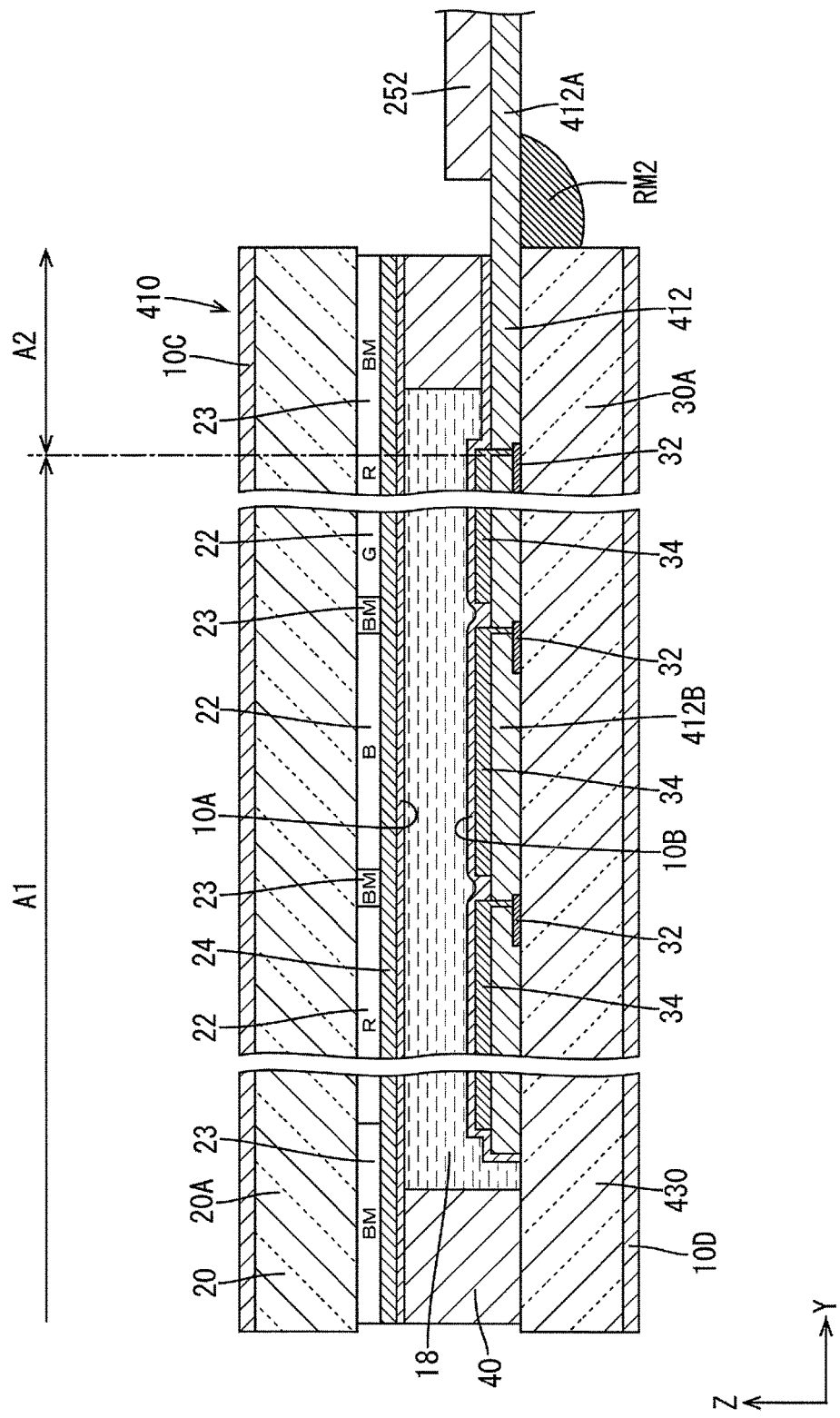
FIG. 15 is a schematic cross-sectional view of a liquid crystal panel according to a second modification of the second embodiment.

A second modification of the second embodiment will be described with reference to FIG. 15. In a liquid crystal display device according to this modification, a configuration of a flexible circuit board 412A of a resin film 412 differs from the second embodiment. Other configurations are similar to those of the liquid crystal display device described in the second embodiment section. In this modification, as illustrated in FIG. 15, second resin material member RM2 having flexibility is bonded to a section of a back surface of the flexible circuit board 412A of the resin film 412 between the sealant 40 and the reinforcing resin film 252. With such a configuration, the section of the flexible circuit board 412A of the resin film 412 outside the sealant 40 can be folded easily and the strength of the resin film 412 at the edge section can be ensured.

Third Modification of Second Embodiment

Figure 16:
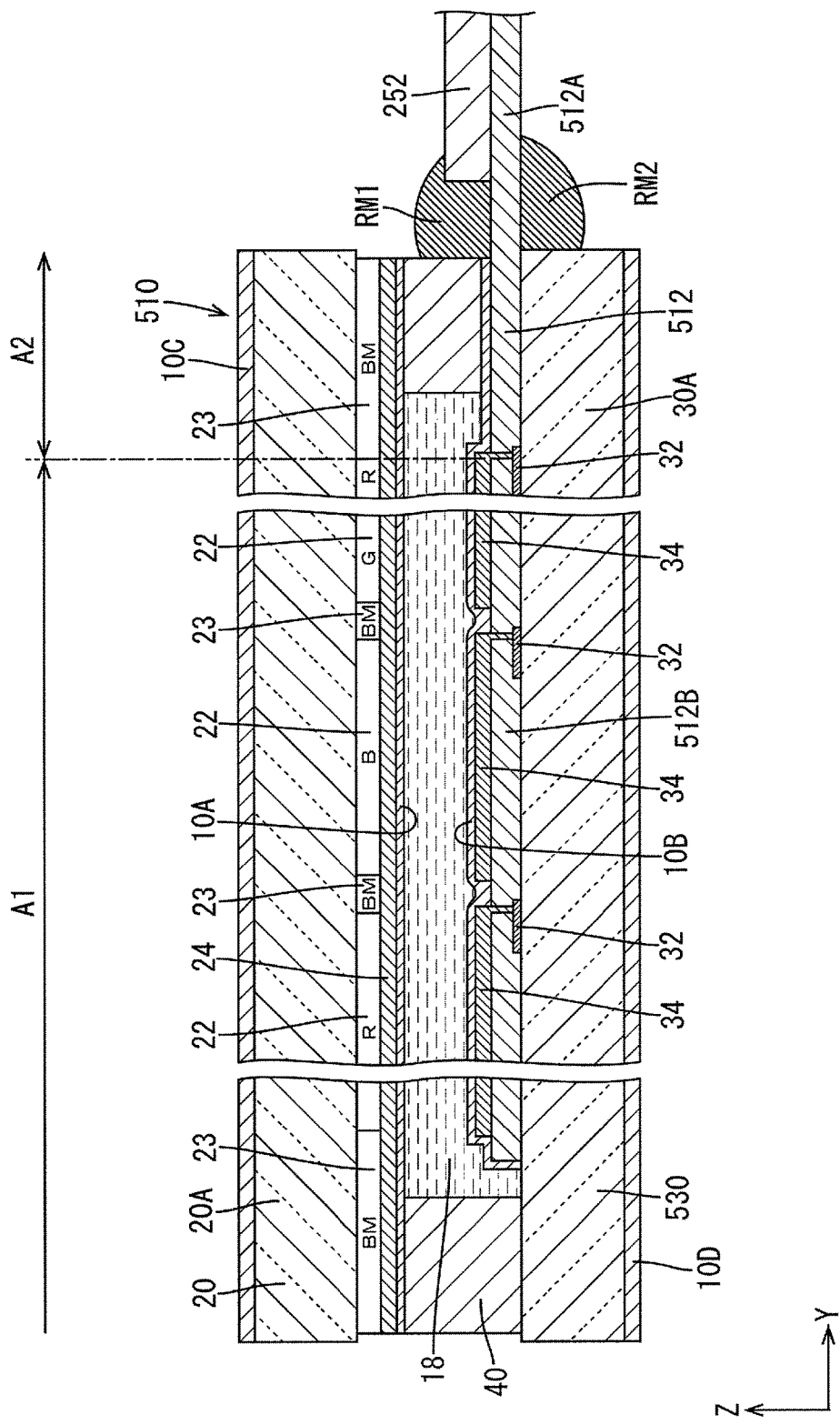
FIG. 16 is a schematic cross-sectional view of a liquid crystal panel according to a third modification of the second embodiment.

A third modification of the second embodiment will be described with reference to FIG. 16. In a liquid crystal display device according to this modification, a configuration of a flexible circuit board 512A of a resin film 512 differs from the second embodiment. Other configurations are similar to those of the liquid crystal display device described in the second embodiment section. In this modification, as illustrated in FIG. 16, the first resin material member RM1 and the second resin material member RM2 are bonded to sections of a front surface and a back surface of the flexible circuit board 512A of the resin film 512 between the sealant 40 and the reinforcing resin film 252. With such a configuration, the section of the flexible circuit board 512A of the resin film 512 outside the sealant 40 can be folded easily and the strength of the resin film 512 at the edge section can be ensured.

Third Embodiment

Figure 17:
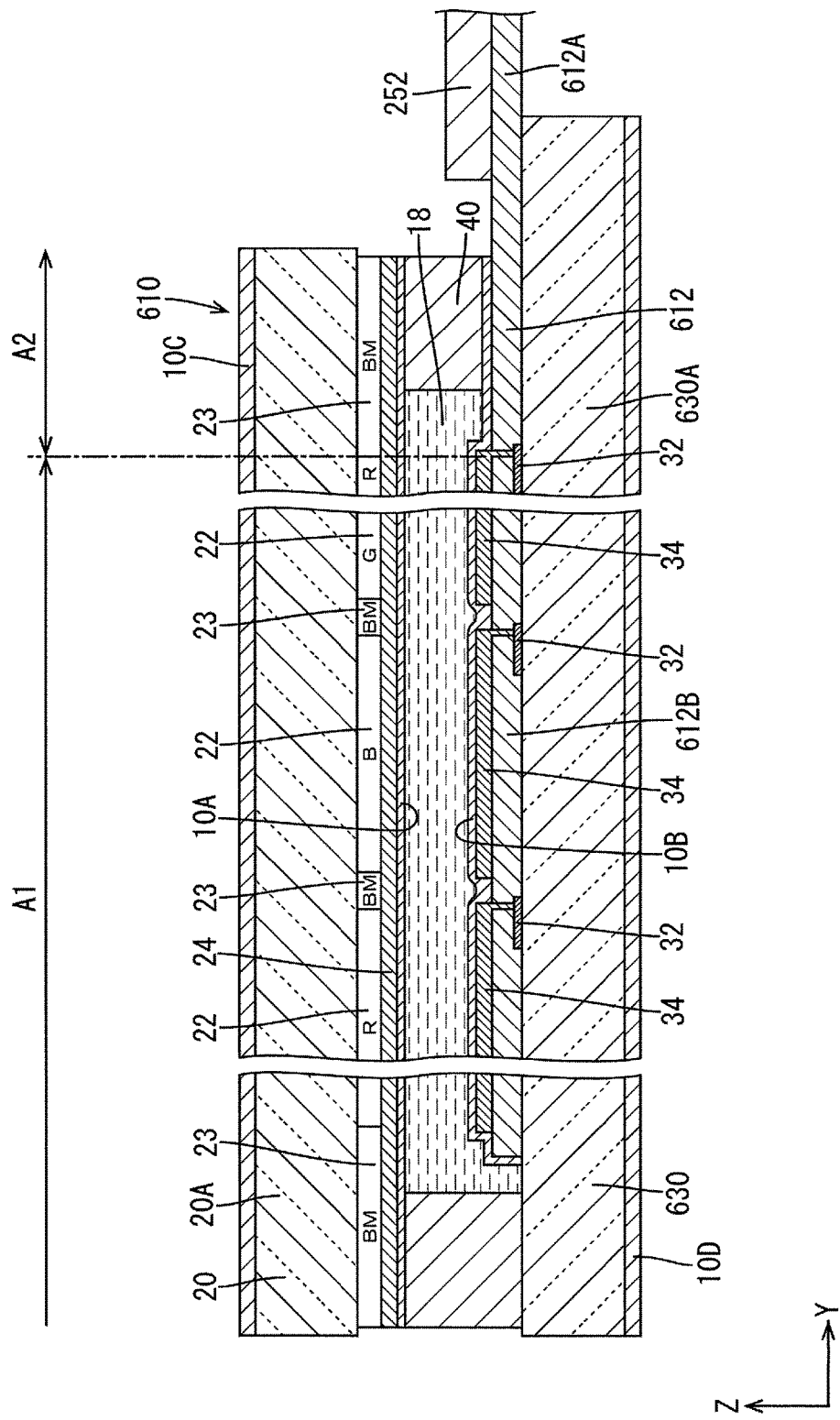
FIG. 17 is a schematic cross-sectional view of a liquid crystal panel according to a third embodiment.

A third embodiment will be described with reference to FIG. 17. In a liquid crystal display device according to this embodiment, a second glass substrate 630A of a liquid crystal panel 610 has a size different from the second embodiment. Other configurations are similar to those of the second embodiment and thus will not be described. In this embodiment, as illustrated in FIG. 17, similarly to the second embodiment, the liquid crystal panel 610 includes the reinforcing resin film 252 bonded to the section of the resin film 612 outside the sealant 40. The second glass substrate 630A has a size greater than the second embodiment and extends to the position overlapping the reinforcing resin film 252 in the Z-axis direction (a thickness direction of the second glass substrate 630A).

According to the above configuration of this embodiment, the edge section of the liquid crystal panel 610 is reinforced by the second glass substrate 630A. The strength of the resin film 612 can be ensured without providing the resin material members RM1, RM2 at the section between the sealant 40 and the reinforcing resin film 252.

Fourth Embodiment

Figure 18:
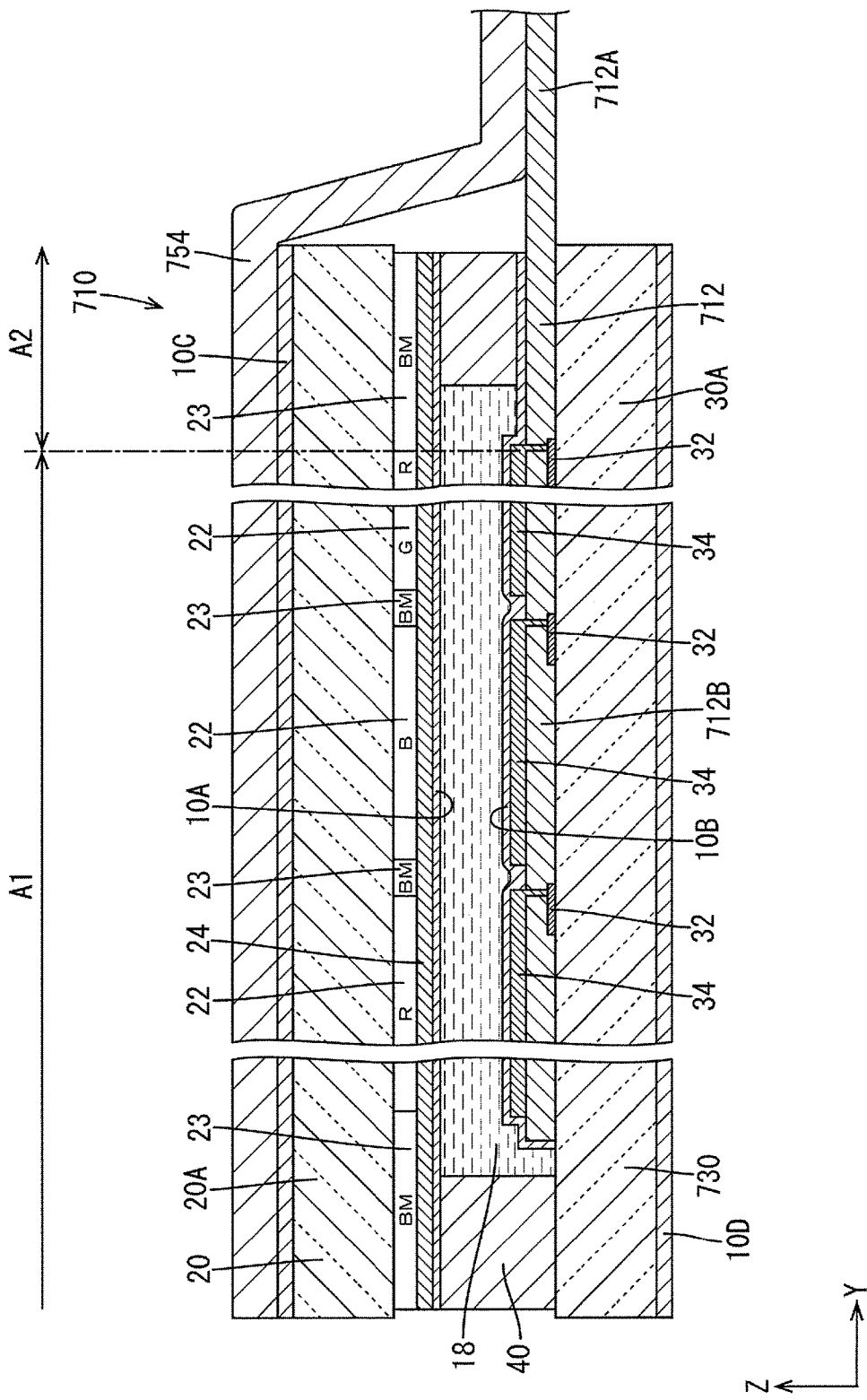
FIG. 18 is a schematic cross-sectional view of a liquid crystal panel according to a fourth embodiment.

A fourth embodiment will be described with reference to FIG. 18. In a liquid crystal display device according to this embodiment, a configuration of a reinforcing resin film for reinforcing a resin film 712 differs from the second and third embodiments. Other configurations are similar to those of the first embodiment and thus will not be described. In this embodiment, as illustrated in FIG. 18, the liquid crystal panel 610 includes a reinforcing resin film 754 bonded to a section of the resin film 712 above the first glass substrate 20A and a section thereof outside the sealant 40. The reinforcing resin film 754 extends continuously from a section above the first glass substrate 20A to a section of the resin film 712. Similarly to the reinforcing resin film 252 of the second embodiment, the reinforcing resin film 754 increases the thickness of the resin film 712 to reinforce the section of the resin film 712 outside the sealant 40.

If the resin material member is disposed between the sealant and the reinforcing resin film, the resin material member may be removed from the resin film depending on the bonding strength between the resin material and the resin film when the section of the resin film outside the sealant is folded. With the configuration of this embodiment, the section of the reinforcing resin film 754 is disposed on the first glass substrate 20A to be supported by the first glass substrate 20A. Therefore, the strength of the resin film 712 can be ensured at the edge section without providing the resin material between the sealant 40 and the reinforcing resin film 754.

Modification of Fourth Embodiment

Figure 19:
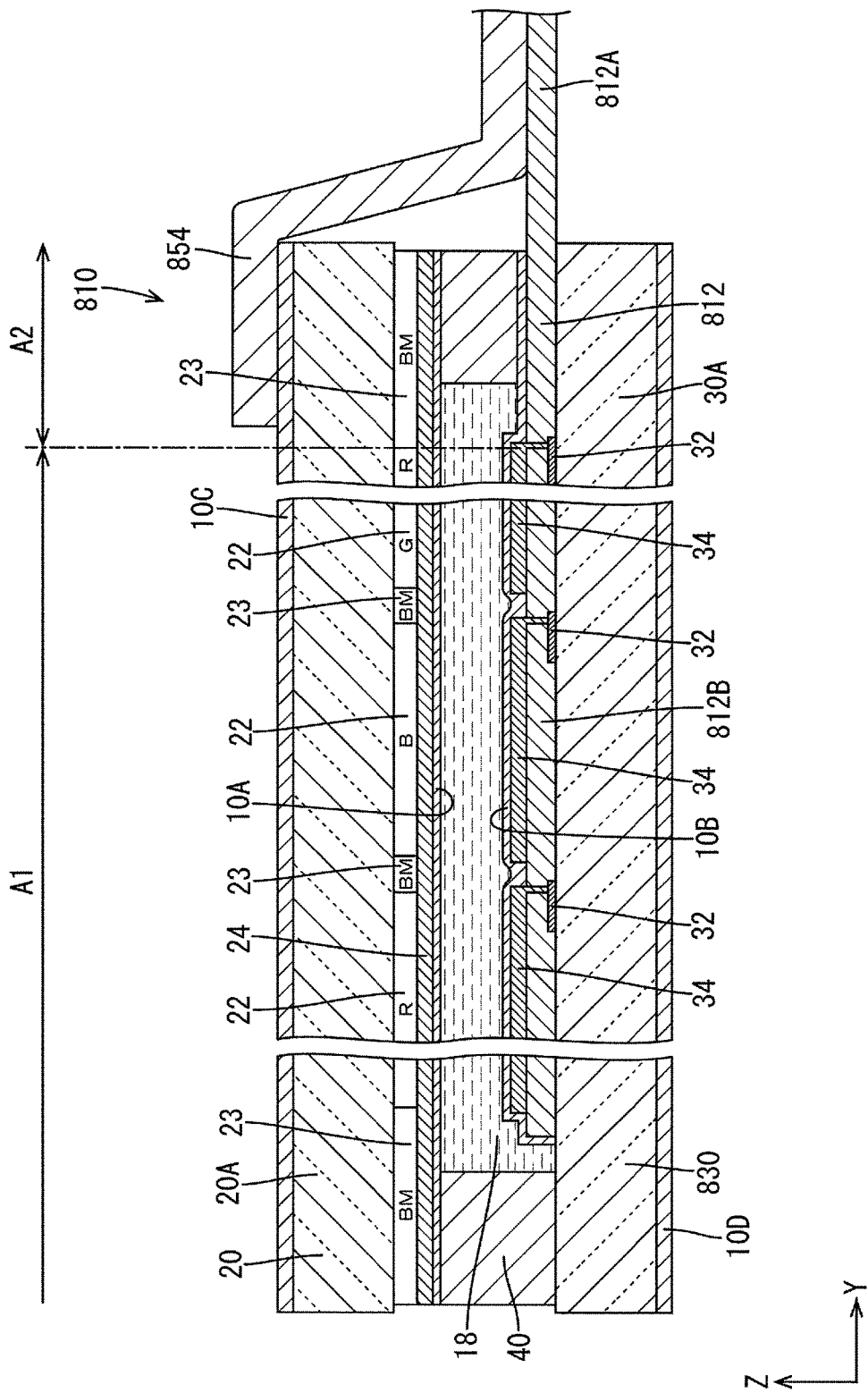
FIG. 19 is a schematic cross-sectional view of a liquid crystal panel according to a modification of the fourth embodiment.

A modification of the fourth embodiment will be described with reference to FIG. 19. In a liquid crystal display device according to this modification, arrangement of a reinforcing resin film 854 differs from the fourth embodiment. Other configurations are similar to the liquid crystal display device of the fourth embodiment. In a liquid crystal panel 810 of this modification, as illustrated in FIG. 19, unlike the fourth embodiment, the section of the reinforcing resin film 854 disposed on the first glass substrate 20A overlaps only the non-display area A2 in the Z-axis direction (the thickness direction of the first glass substrate 20A). In other words, the reinforcing resin film 854 does not overlap the display area A1 in the Z-axis direction.

If the section of the reinforcing resin film overlaps the display area in the Z-axis direction similarly to the fourth embodiment, the display quality of the liquid crystal panel may be deteriorated depending on light transmittance of the reinforcing resin film. In this modification, the reinforcing resin film 854 does not overlap the display area A1 in the Z-axis direction. Therefore, even if the section of the reinforcing resin film 854 is disposed above the first glass substrate 20A, the display quality of the liquid crystal panel 810 is not adversely affected and the strength of the resin film 812 is ensured at the edge section.

According to the fourth embodiment and the modification thereof, as illustrated in FIGS. 18 and 19, the reinforcing resin films 754, 854 are disposed on the respective sections of the resin films 712, 812 before the sections of the resin films 712, 812 outside the sealant 40 are folded. In the process of producing the liquid crystal panels 710, 810, the reinforcing resin films 754, 854 may be disposed on the sections of the resin films 712, 812, respectively, after the sections outside the sealant 40 are folded.

Fifth Embodiment

Figure 20:
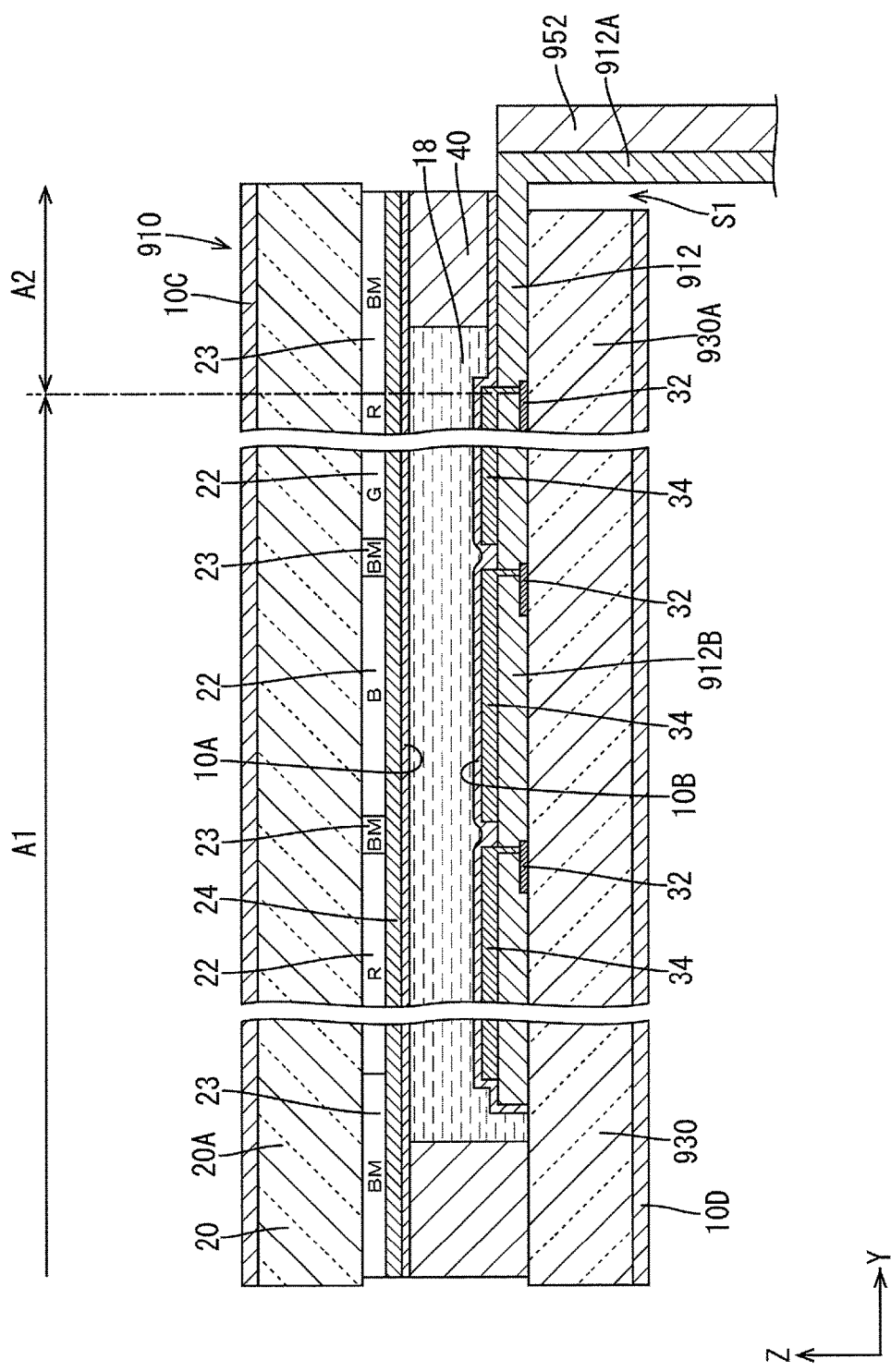
FIG. 20 is a schematic cross-sectional view of a liquid crystal panel according to a fifth embodiment.

A fifth embodiment will be described with reference to FIG. 20. In a liquid crystal display device according to this embodiment, a second glass substrate 930A has a size different from the first embodiment. Other configurations are similar to those of the first embodiment and thus will not be described. In this embodiment, as illustrated in FIG. 20, the second glass substrate 930A included in a liquid crystal panel 910 has a size smaller than that of the first embodiment. Specifically, the second glass substrate 930A has an end surface (on the right side in FIG. 20) from which the resin film 912 extends outside the sealant 40 and the end surface is located inside an outer surface of the sealant 40 and overlaps the sealant 40.

In this embodiment, with a configuration of the second glass substrate 930A having the above size, a gap S1 is provided between the end surface of the second glass substrate 930A and the folded section of the resin film 912, as illustrated in FIG. 20. The end surface of the second glass substrate 930A is not in contact with the folded section of the resin film 912 by the gap S1. Therefore, in the liquid crystal display device of this embodiment, the folded section of the resin film 912 is less likely to be damaged by the end surface of the second glass substrate 930A.

Sixth Embodiment

Figure 21:
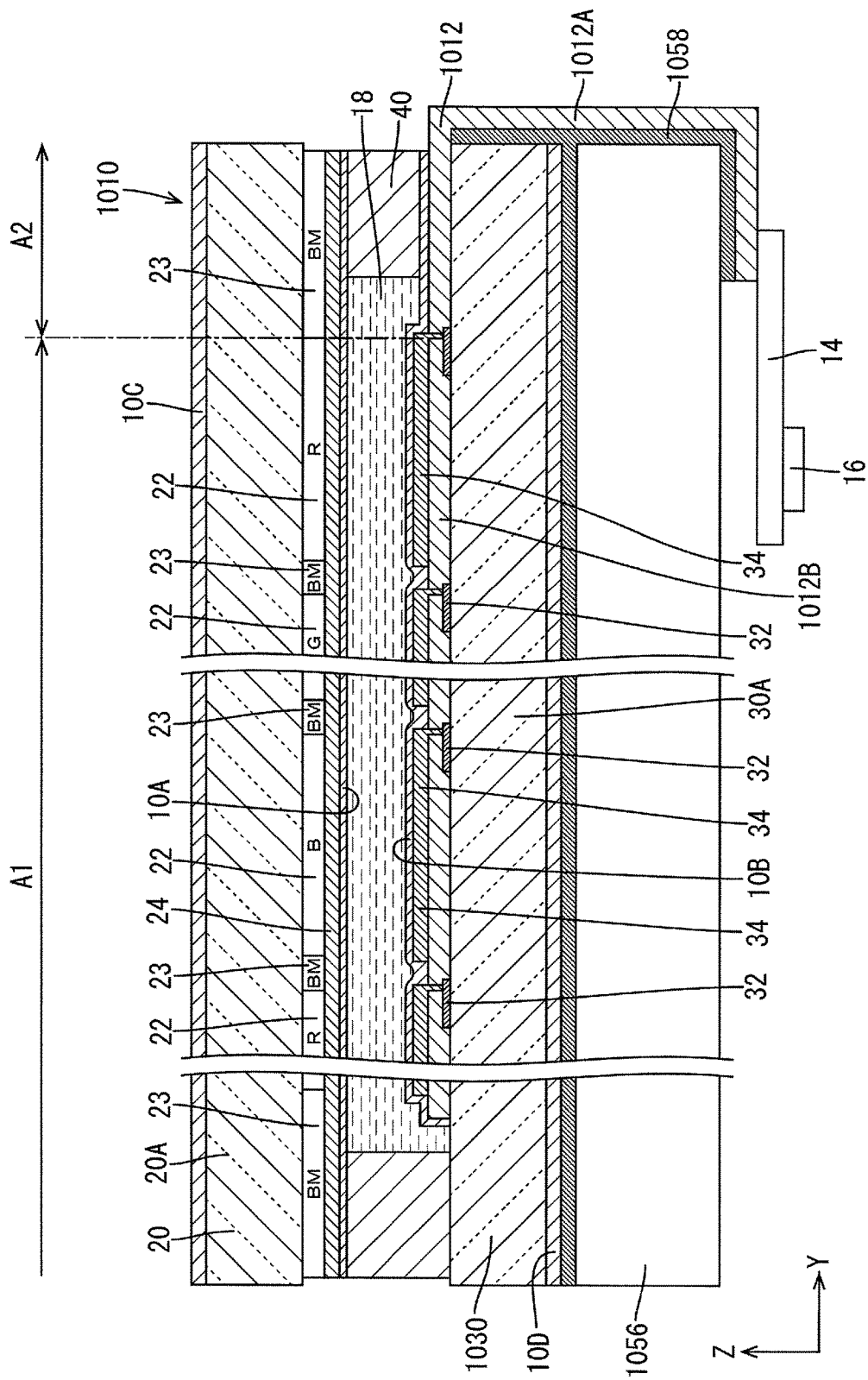
FIG. 21 is a schematic cross-sectional view of a liquid crystal display device according to a sixth embodiment.

Next, a sixth embodiment will be described with reference to FIG. 21. As illustrated in FIG. 21, a liquid crystal display device according to this embodiment includes a backlight device (an example of the lighting device) 1056 that is fixed on a rear side of a liquid crystal panel 1010 with adhesive agent 1058. An end of a folded section of a resin film 1012 outside the sealant 40 is folded to the rear side of the backlight device. The folded section as a whole is fixed to the backlight device 1056 with the adhesive agent 1058. The end of the folded section of the resin film 1012 positioned on the rear side of the backlight device 1056 is connected to the control circuit board 14 on which the IC chip 16 is mounted.

In this embodiment, with the above configuration, the liquid crystal display device can be thinner compared to a configuration that the liquid crystal panel or the flexible circuit board is away from the backlight device. If the liquid crystal panel or the flexible circuit board is away from the backlight device, the flexible circuit board may be warped and damaged when the flexible circuit board is mounted on a casing of the liquid crystal display device during the production process of the liquid crystal display device. However, in this embodiment having the above configuration, the flexible circuit board 1012A of the resin film 1012 is less likely to be damaged during the production process of the liquid crystal display device.

Seventh Embodiment

Figure 22:
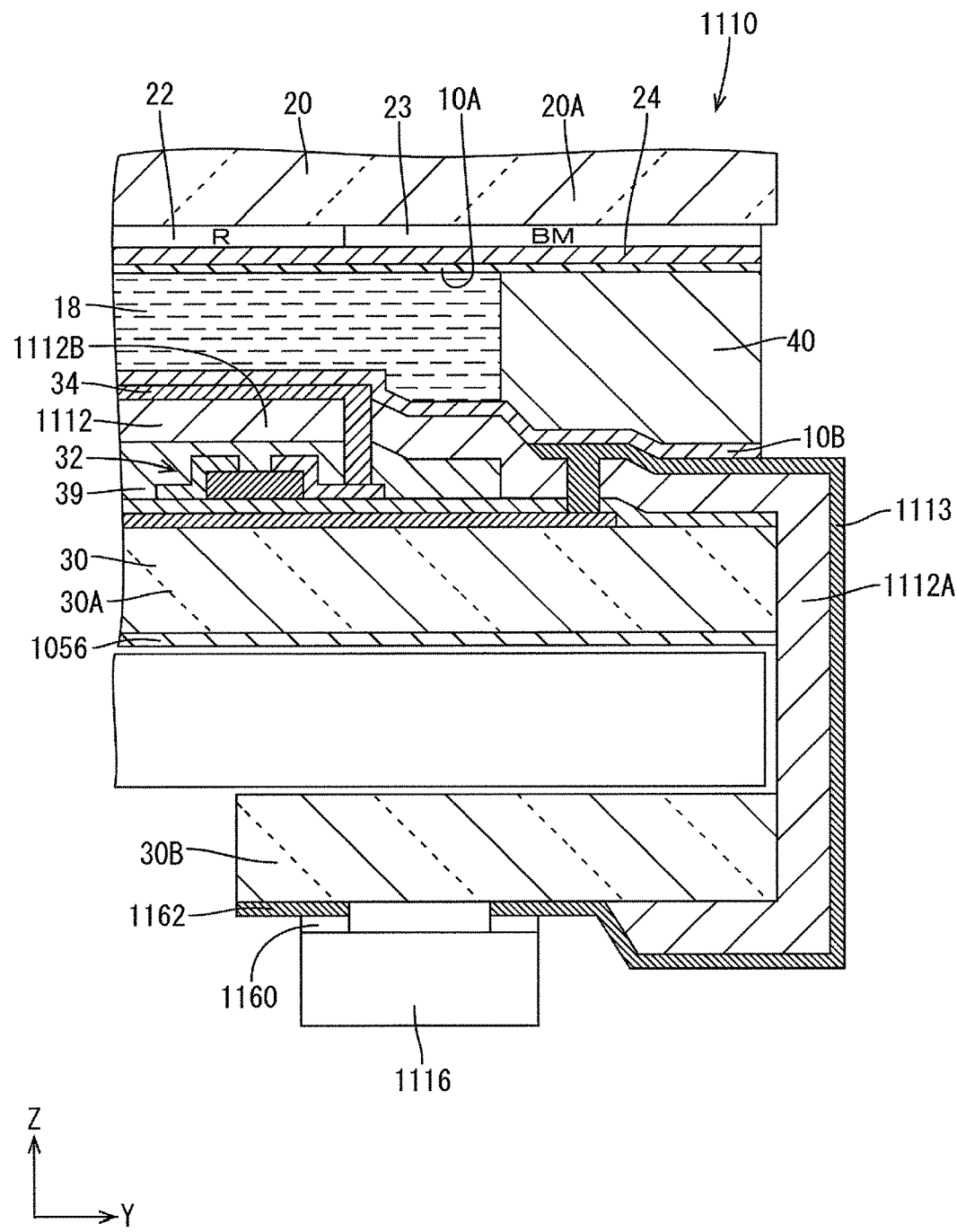
FIG. 22 is a magnified cross-sectional view of a liquid crystal display device according to a seventh embodiment.

A seventh embodiment will be described with reference to FIGS. 22 to 25. A liquid crystal display device according to this embodiment differs from that of the first embodiment in that an IC chip 1116 is mounted on a third glass substrate 30B that is on a rear surface side of a backlight device 1056 by the chip-on-glass (COG) mounting method. Other configurations are similar to those of the first embodiment and thus will not be described. In this embodiment, as illustrated in FIG. 22, an end of the folded section of the resin film 1112 is on the rear side of the backlight device 1056 and is connected to the third glass substrate 30B.

Connection lines 1113 that are disposed on a flexible circuit board 1112A of the resin film 1112 extend on the third glass substrate 30B. Pattern lines 1162 are formed on the third glass substrate 30B away from the connection lines 1113. The IC chip 1116 is mounted on the third glass substrate 30B by the COG mounting method via an anisotropic conductive film 1160 to extend from the connection lines 1113 to the pattern lines 1162 on the third glass substrate 30B. With this configuration, the connection lines 1113 and the pattern lines 1162 are electrically connected to each other. As is not illustrated, a control circuit board may be connected to the pattern lines 1162 via another flexible circuit board.

Figure 23:
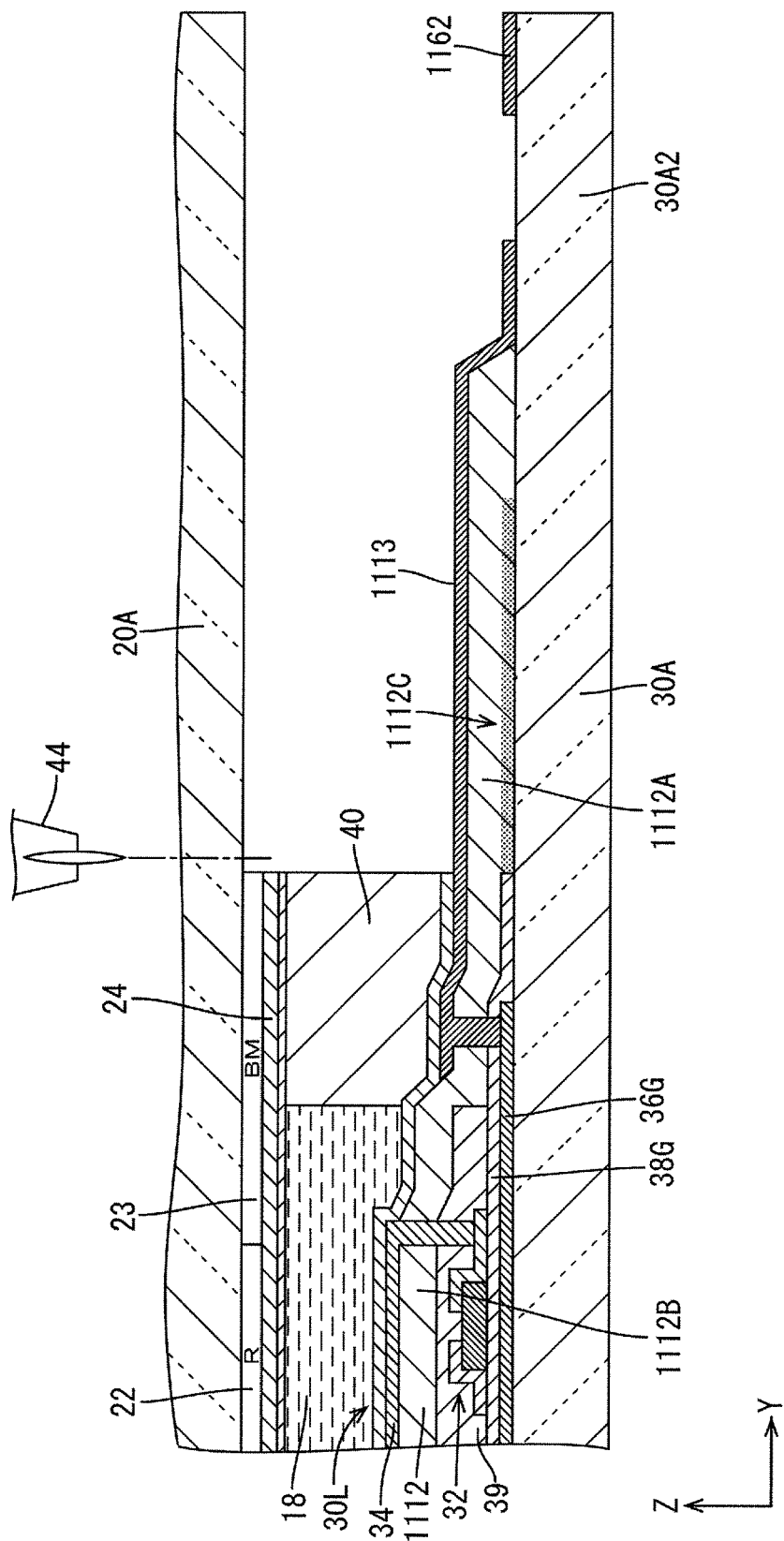
FIG. 23 is a cross-sectional view illustrating process (1) of a method of producing the liquid crystal display device according to the seventh embodiment.

Next, a method of producing a liquid crystal panel 1110 having the above configuration will be described. Similarly to the first embodiment, the thin film forming process, the line forming process, and the bonding process are performed. As illustrated in FIG. 23, in the thin film forming process, the resin film 1112 is formed on the second glass substrate 30A while keeping an area (30A2 in FIG. 23) where the resin film 1112 is not formed in the other section of the second glass substrate 30A (a section having no thin film patterns 30L). In the line forming process, the pattern lines 1162 are formed near a distal end of the connection lines 1113 (on the section 30A2 having no resin film 1112) and opposite and away from the distal end of the connection lines 1113 having a predefined space therebetween. The pattern lines 1162 are made of the same material as the connection lines 1113.

Figure 24:
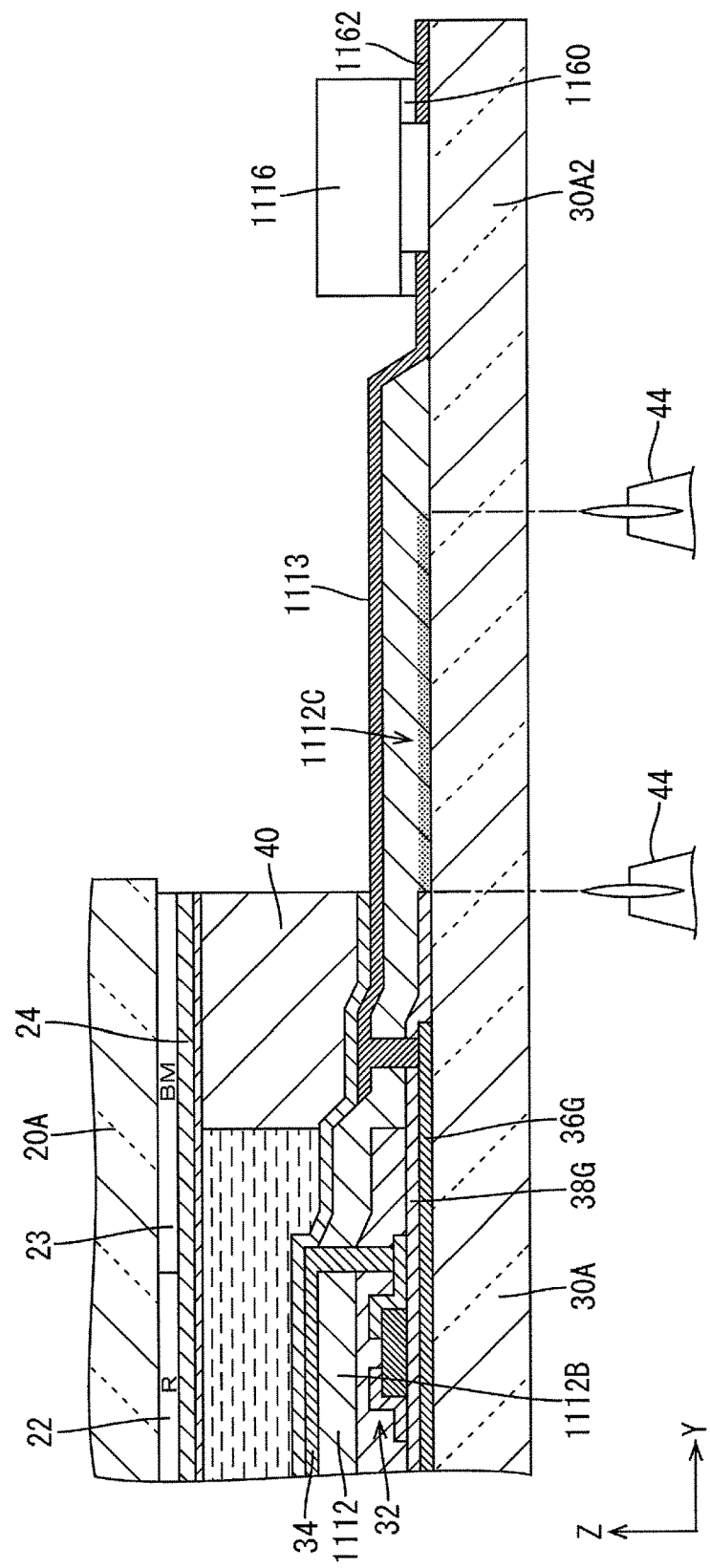
FIG. 24 is a cross-sectional view illustrating process (2) of a method of producing the liquid crystal display device according to the seventh embodiment.

Next, the light applying process is performed. In this process, laser beam is applied to a boundary between a section of the resin film 1112 and the second glass substrate 30A except for the end section of the resin film 1112 (a section near the section 30A2 where the resin film 1112 is not formed). A weak layer 1112C is formed at the boundary of the resin film 1112 (see FIG. 23). Then, the second substrate removing process will be performed similarly to the first embodiment. The second substrate removing process may be performed prior to the light applying process. Next, as illustrated in FIG. 24, the IC chip 1116 is mounted on the section 30A2 of the second glass substrate 30A provided in the thin film forming process (a mounting process). In the mounting process, the IC chip 1116 is mounted on the section 30A2, on which the resin film 1112 is not formed, by the COG mounting method via the anisotropic conductive film 61160 to extend from the connection lines 1113 to the pattern lines 1162.

Figure 25:
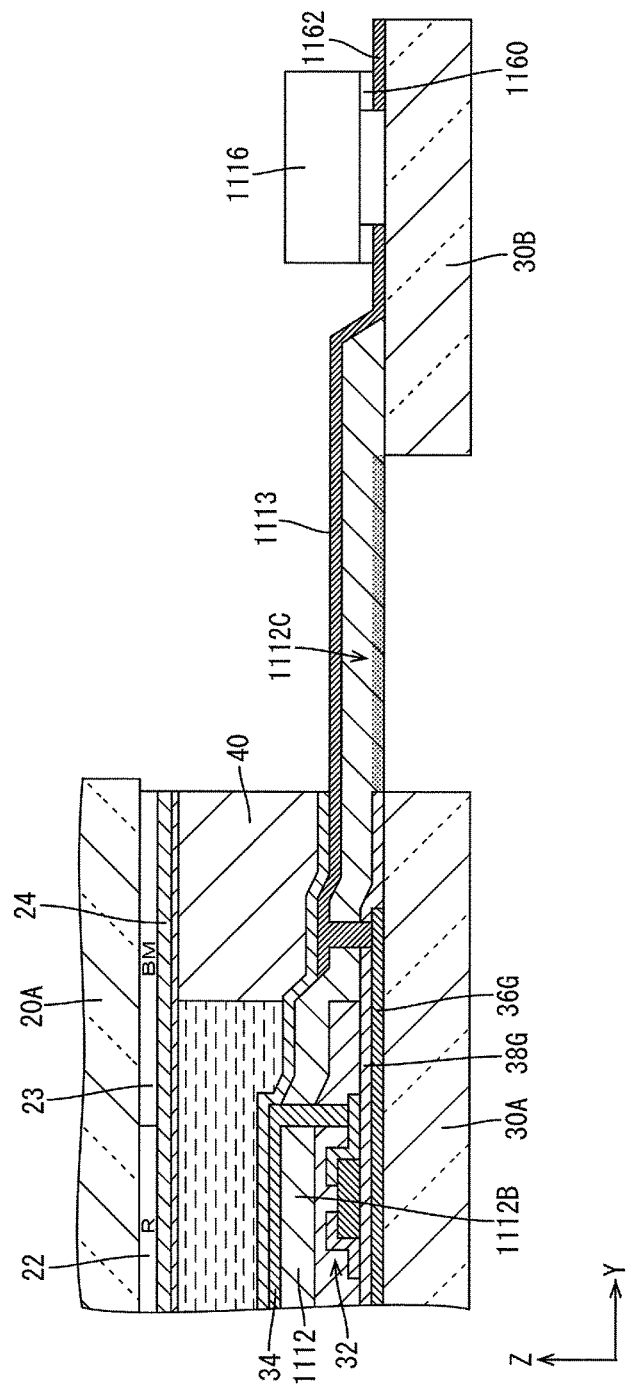
FIG. 25 is a cross-sectional view illustrating process (3) of the method of producing the liquid crystal display device according to the seventh embodiment.

Next, the first substrate removing process is performed. As illustrated in FIG. 24, in this process, the second glass substrate 30A is cut at two boundaries between the section to which the laser beam is applied in the light applying process and other sections. The section of the second glass substrate 30A that is between the two boundaries is separated and removed from the resin film 1112. Accordingly, as illustrated in FIG. 25, the section of the second glass substrate 30A is removed and the section 30A2 of the second glass substrate 30A provided in the thin film forming process corresponds to the third glass substrate 30B that is away from the second glass substrate 30A.

Thereafter, the polarizing plates are bonded to the outer surfaces of the glass substrates 20A and 30A and a backlight device 1056 is mounted on the rear side of the array board 30, and the control circuit board is connected to the pattern lines 1162 on the third glass substrate 30B. Then, the section of the resin film 1112 outside the sealant 40 is warped and folded such that the third glass substrate 30B is on the rear side of the backlight device 1056. Through the processes, the liquid crystal panel in this embodiment is complete.

According to the production method of this embodiment as described before, the IC chip 1116 is mounted on the section 30A2 of the glass substrate 30A where the resin film 1112 is not formed in the mounting process, and the section of the second glass substrate 30A outside the sealant 40 and except for the section 30A2 having no resin film 1112 is removed from the section of the second glass substrate 30A outside the sealant 40 in the first substrate removing process. Accordingly, after the first substrate removing process, the resin film 1112 positioned between the sealant 40 and the IC chip 1116 can be warped and folded. Therefore, the IC chip 1116 can be mounted by the COG mounting method on the second glass substrate 30A without having need for providing the mounting area for the IC chip 1116 outside the sealant 40. The liquid crystal display device having a narrower frame can be produced.

Modifications of each of the above embodiments will be described below.

(1) In each of the above embodiments, a section of the thin film patterns of the resin film functions as the interlayer insulator film. The function of the section of the thin film patterns of the resin film is not limited thereto. For example, a section of the thin film patterns of the resin film may function as a protective insulator film.

(2) In each of the above embodiments, the resin film is made of a polyimide film that is transparent. However, the material of the resin film is not limited thereto. A section of the resin film overlaps the display area of the liquid crystal panel and therefore, the resin film is preferably made of material having high transmissivity.

(3) In each of the above embodiments, the liquid crystal panel has a rectangular plan view shape. However, a liquid crystal panel having an outline a part of which is curved may be included in a scope of the present invention.

(4) In each of the above embodiments, the liquid crystals are injected into a section surrounded by the sealant by the one drop fill (ODF) method using the liquid crystal dropping device to form the liquid crystal layer between the substrates. However, it is not limited thereto and the liquid crystals may be injected into a section between the substrates after the bonding process.

(5) In each of the above embodiments, the IC chip is mounted on the control circuit board and the IC chip is mounted on the third glass substrate that is disposed away from the second glass substrate. However, if the material of the flexible circuit board has good heat resistance properties, a mounting area for mounting the IC chip may be provided on an end of the flexible circuit board that is opposite end from an end thereof to be connected to the second glass substrate in the resin film forming process, and the IC hip may be mounted on the area provided at the end of the flexible circuit board in the mounting process.

(6) In each of the above embodiments, a driving type of the liquid crystal panel is a twisted nematic (TN) type in a method of producing a liquid crystal display device. However, it is not limited thereto and a driving type of the liquid crystal panel may be an in-plane switching (IPS) type, a multi-domain vertical alignment (MVA) type, or a fringe field switching (FFS) type.

(7) In each of the above embodiments, the liquid crystal display device and the method producing thereof are described. However, it is not limited thereto and display devices other than a liquid crystal display device may be included in a scope of the present invention. For example, a method of producing an organic EL display device may be included in a scope of the present invention.

The embodiments of the present invention are described in detail. However, the present invention is not limited to the embodiments. Modifications or altered modes of the embodiments described above are also included in the technical scope of the present invention.

EXPLANATION OF SYMBOLS

1: Liquid crystal display device, 10, 110, 210, 310, 410, 510, 610, 710, 810, 910, 1010, 1110: Liquid crystal panel, 12, 112, 212, 312, 412, 512, 612, 712, 812, 912, 1012, 1112: Resin film, 12A, 112A, 212A, 312A, 412A, 512A, 612A, 712A, 812A, 912A, 1012A, 1112A: Flexible circuit board, 12B, 112B, 212B, 312B, 412B, 512B, 612B, 712B, 812B, 912B, 1012B, 1112B: Interlayer insulator film, 12C, 1112C: Weak layer, 13, 113, 1113: Connection lines, 14: Control circuit board, 16, 1116: IC chip, 18: Liquid crystal layer, 20: Color filter board, 20A: First glass substrate, 22: Color filter, 23: Light blocking section, 24: Counter electrode, 30, 130, 230, 330, 430, 530, 630, 730, 830, 930, 1030: Array board, 30A, 630A, 930A: Second glass substrate, 30B: Third glass substrate, 30L: Thin film patterns, 32: TFT, 32D: Drain electrodes, 32G: Gate electrodes, 32S: Source electrodes, 34: Pixel electrodes, 36G: Gate lines, 37: Semiconductor film, 38G: Gate insulator film, 39: Protective insulator film, 40: Sealant, 44: Scriber, 252, 754, 854: Reinforcing resin film, 1160: Anisotropic conductive film, 1162: Pattern films, A1: Display area, A2: Non-display area, CH1: First contact hole, CH2: Second contact hole, CH3: Third contact hole, L1: Laser beam, RM1: First resin material member, RM2: Second resin material member, S1: Gap

The invention claimed is:

1. A display device comprising:
a display panel including a first substrate having thin film patterns on a section of a plate surface thereof, and a second substrate that is bonded to the first substrate with sealant that is disposed to surround the thin film patterns, the display panel performing displaying; and
a resin film having flexibility and configuring a section of the thin film patterns and extending outside the sealant continuously from the thin film patterns, the resin film having a section outside the sealant and at least the section having metal lines through which signals for driving the display panel are transmitted; and
a reinforcing resin film on at least a part of the section of the resin film outside the sealant to increase a thickness of the resin film and reinforce the resin film.

2. The display device according to claim 1, further comprising a resin material member having flexibility on a section of the resin film between the sealant and the reinforcing resin.

3. The display device according to claim 1, wherein the first substrate extends to a position overlapping the reinforcing resin film in a thickness direction of the first substrate.

4. The display device according to claim 1, wherein the reinforcing resin film is disposed continuously from the second substrate to a section of the resin film.

5. The display device according to claim 4, wherein
the display panel includes a display area and a non-display area within a panel surface area, the display area displaying images and the non-display area displaying no images, and
the reinforcing resin has a section positioned above the second substrate and the section overlaps only the non-display area in a thickness direction of the second substrate.

6. The display device according to claim 1, wherein
the section of the resin film outside the sealant is folded in an opposite side from the second substrate, and a gap is provided between an end surface of the first substrate and a folded section of the resin film.

7. A display device comprising:
a display panel including a first substrate having thin film patterns on a section of a plate surface thereof, and a second substrate that is bonded to the first substrate with sealant that is disposed to surround the thin film patterns, the display panel performing displaying; and
a resin film having flexibility and configuring a section of the thin film patterns and extending outside the sealant continuously from the thin film patterns, the resin film having a section outside the sealant and at least the section having metal lines through which signals for driving the display panel are transmitted; and
a lighting device supplying light rays to the display panel, wherein
one of the substrates is fixed to the lighting device, and
at least a part of the section of the resin film outside the sealant is fixed to the lighting device.

8. A method of producing a display device comprising:
a thin film forming process of forming thin film patterns including first metal lines and a resin film on one section of a first substrate and forming the resin film on another section of the first substrate;
a line forming process of forming second metal lines on a section of the resin film to be directly connected to the first metal lines;
a bonding process of disposing sealant on the first substrate to surround the thin film patterns and such that the resin film is disposed inside and outside a surrounded area, and bonding the first substrate and a second substrate opposite each other with the sealant after the line forming process;
a second substrate removing process of removing a section of the second substrate outside the sealant after the bonding process; and
a first substrate removing process of separating and removing at least a part of a section of the first substrate outside the sealant from the resin film after the bonding process.

9. The method of producing a display device according to claim 8, wherein
in the thin film forming process, the resin film is formed continuously on the one section of the first substrate and the other section of the first substrate, and
in the bonding process, the sealant is applied onto the first substrate such that the one section of the resin film extends outside the surrounded area.

10. The method of producing a display device according to claim 8, wherein
  in the first substrate removing process, the first substrate is further removed at a section overlapping the sealant in a thickness direction of the first substrate.

11. The method of producing a display device according to claim 8, wherein
  in the thin film forming process, the resin film is formed on the first substrate such that a mounting area for mounting a driver component that drives the display device is provided on an opposite side from an area for forming the thin film patterns on the first substrate, at least a section of the resin film is between the mounting area and the area,
  the method further comprises a mounting process of mounting the driver component on the mounting area on the first substrate provided in the thin film forming process after the second substrate removing process, and
  in the first substrate removing process, at least a section of an area of the first substrate except for the mounting area provided in the thin film forming process is removed.

* * * * *